US012649221B2

(12) United States Patent

Yoshikane et al.

(10) Patent No.: US 12,649,221 B2

(45) Date of Patent: Jun. 9, 2026

(54) DRIVING TOOLS

(71) Applicant: MAKITA CORPORATION, Anjo (JP)

(72) Inventors: Kiyonobu Yoshikane, Anjo (JP); Tatsuya Ikedo, Anjo (JP)

(73) Assignee: MAKITA CORPORATION, Anjo (JP)

( * ) Notice: Subject to any disclaimer, the term of this patent is extended or adjusted under 35 U.S.C. 154(b) by 84 days.

(21) Appl. No.: 18/949,578

(22) Filed: Nov. 15, 2024

(65) Prior Publication Data

US 2025/0187163 A1 Jun. 12, 2025

(30) Foreign Application Priority Data

Dec. 11, 2023 (JP) ................................ 2023-208460

(51) Int. Cl.

*B25C 1/06* (2006.01)
*B25C 1/00* (2006.01)
*B25C 1/04* (2006.01)

(52) U.S. Cl.

CPC ................ *B25C 1/06* (2013.01); *B25C 1/003* (2013.01); *B25C 1/047* (2013.01)

(58) Field of Classification Search

CPC ............ B25C 1/003; B25C 1/06; B25C 1/047

See application file for complete search history.

(56) References Cited

U.S. PATENT DOCUMENTS 11,491,629 B2 11/2022 Saitou et al.
11,981,005 B2 5/2024 Kuriki et al.

FOREIGN PATENT DOCUMENTS

JP 2023-064259 A 5/2023
WO 2018/198670 A1 11/2018

*Primary Examiner* — Daniel Jeremy Leeds

(74) *Attorney, Agent, or Firm* — Oliff PLC

(57) ABSTRACT

A driving tool has a main motor, a sub-motor, and a fan. The main motor serves as a driving source to generate electric power to move a driver and is accommodated in a main body housing. The sub-motor is driven independently from the main motor and accommodated in the main body housing. The fan is mounted on an output shaft of a sub-motor.

20 Claims, 16 Drawing Sheets

DRIVING TOOLS

CROSS-REFERENCE TO RELATED APPLICATIONS

This application claims priority to Japanese patent application serial number 2023-208460 filed Dec. 11, 2023, the contents of which are incorporated herein by reference in their entirety for all purposes.

BACKGROUND

The present disclosure relates to driving tools for driving driven members into a workpiece.

JP2023-064259A and WO2018/198670 disclose a gas-spring type driving tool utilizing a thrust of compressed gas as a driving force. The driving tool has a driver configured to strike driven members, a lift mechanism to move the driver to a standby position or top dead center, and a motor as a drive source of the lift mechanism. The driving tool includes a controller configured to control a driving of the motor. The motor, controller, and other components are installed in a main body housing of the driving tool. A fan is mounted on an output shaft of the motor so as to rotate integrally. A cooling air flowing through the main body housing is generated as the fan rotates. The cooling air may serve, for example, to cool electrical components such as a motor and a controller.

The motor of the driving tool is driven only when the driver is moved to the standby position or to the top dead center. Therefore, the driving time of the motor is short. Therefore, the time during which the fan rotates integrally with the output shaft of the motor to generate cooling air is also short. The electrical components may therefore not be sufficiently cooled. In addition to the motor and controller, the driving tool may also be equipped with electrical components that generate a significant amount of heat, such as, for example, solenoids. There was room for improvement in the cooling structure of the driving tool to ensure that the electrical components could be cooled, including those that generate excessive heat.

Therefore, there has been a need for a driving tool capable of cooling the electrical components efficiently.

SUMMARY

According to one aspect of the present disclosure a driving tool may include a main motor as a driving source to generate a driving force to drive a driver in a driving direction. A main motor is accommodated in a main body housing. A sub-motor, which is driven independently from the main motor, is accommodated in the main body housing. A fan is mountable on an output shaft of the sub-motor.

Since the sub-motor is driven independently from the main motor, it drives longer than the main motor to rotate the fan. This allows the cooling air to flow into the main body housing to cool down the main motor, the sub-motor, and other electrical components for a longer period of time.

BRIEF DESCRIPTION OF THE DRAWINGS

FIG. 9 is an enlarged right side view of the driving tool with the right housing and the driver guide removed when a solenoid is ON.

FIG. 12 is an enlarged lower view of the driving tool with the right housing and the driver guide removed when the solenoid is ON.

DETAILED DESCRIPTION

Figure 1:
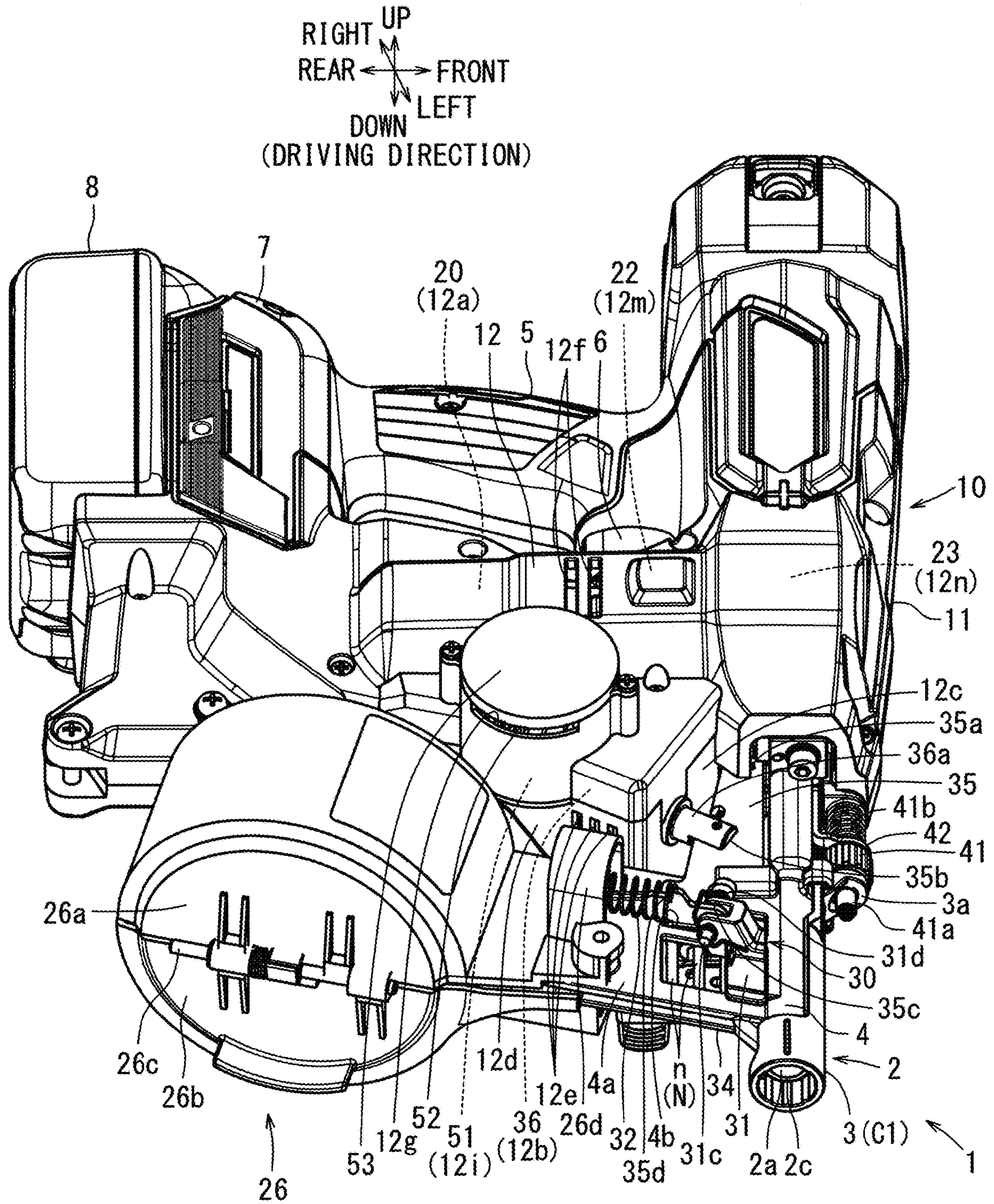
FIG. 1 is a perspective view of a driving tool according to a first embodiment.

A driving tool according to one aspect of the present disclosure includes a controller that transmits a drive signal to a sub-motor so that the sub-motor can be operable even when the main motor is stopped. Therefore, by driving the sub-motor even when the main motor is stopped, the time for the cooling air to cool the electrical components can be extended. Therefore, the electrical components can be sufficiently cooled.

According to another aspect of the present disclosure, the sub-motor may drive longer than the driving time of the main motor when the driver is driven for one cycle of driving operation. Therefore, by extending the driving time of the sub-motor longer than that of the main motor, the cooling efficiency of the electrical components by the cooling air can be improved.

According to another aspect of the present disclosure, the driving tool has a magazine for accommodating driven members. The driving tool has a driver guide that is supplied with the driven members from the magazine and guides the driver in a movable manner. The sub-motor locates in between the main motor and the magazine. Thus, the sub-motor can be compactly arranged between the main motor and the magazine. The arrangement of the magazine relative to the main body housing is set in accordance with the position where driven members are fed into the driver guide. Therefore, a space must be provided between the main motor and the magazine. By using this space to arrange the sub-motor, the driving tool can be configured in a compact manner. Also, the sub-motor can be placed close to the main motor. Therefore, the cooling efficiency of the main motor can be improved by driving the sub-motor.

According to another aspect of the present disclosure, the driving tool has a feed claw configured to feed the driven members from the magazine to the driver guide. A solenoid moves the feed claw in a direction opposite to the feeding direction. The solenoid is provided between the main motor and the magazine. Therefore, the solenoid is placed using a space between the main motor and the magazine. This allows the driving tool to be made compact. Also, the solenoid may be placed near the sub-motor. Therefore, the cooling efficiency of the solenoid can be improved by driving the sub-motor.

According to another aspect of the present disclosure, the solenoid has a tubular holder for accommodating a coil. The main body housing is provided with a solenoid cooling passage through which air flows to pass between the coil and an inner peripheral surface of the holder by driving the sub-motor. Therefore, the solenoid cooling passage can be provided to directly contact the coil. Moreover, heated cooling air is allowed to flow away from the coil quickly. Therefore, the coil can be cooled efficiently.

According to another aspect of the present disclosure, an output shaft of the sub-motor extends in a direction intersecting an extending direction of an output shaft of the main motor and a driving direction of the driven member. Therefore, by intersecting the output shaft of the sub-motor with the output shaft of the main motor, the sub-motor, including the fan, can be compactly arranged with respect to the main motor. By intersecting the output shaft of the sub-motor with the driving direction of the driven member, the driving tool can be prevented from increasing in size in the driving direction. Therefore, the sub-motor can be compactly arranged.

According to another aspect of the present disclosure, the main body housing is provided with a motor cooling passage through which air flows to the main motor by driving the sub-motor. Therefore, the main motor can be cooled by the sub-motor in either event when the main motor is driven and when it is stopped. Therefore, the cooling efficiency of the main motor can be improved. Further, because the main motor has no fan, the load on the main motor can be reduced.

According to another aspect of the present disclosure, a driving tool has a controller configured to transmit a drive signal to the main motor and the sub-motor. The main body housing is provided with a controller cooling passage through which air flows to the controller by driving the sub-motor. Therefore, the controller can be cooled by the sub-motor in either event when the main motor is driving and when it is stopped. Therefore, the cooling efficiency of the controller can be improved.

According to another aspect of the present disclosure, the main body housing is provided with a plurality of cooling passages through which air flows by driving the sub-motor. The main body housing is provided with an exhaust port for discharging air flowing through the plurality of cooling passages. The exhaust port is common to the plurality of cooling passages. Therefore, with the common exhaust port, the air flow in the plurality of cooling passages can be made smooth with less turbulence. This ensures efficient cooling of a plurality of electrical components. Furthermore, the air can be exhausted through the common exhaust port without compromising the comfort of the user who are grasping the driving tool.

According to another aspect of the present disclosure, the driving tool has a piston to which the driver is connected. The driving tool has a cylinder in which the piston is movably provided. The main motor moves the driver back in a counter-driving direction to increase gas pressure in the cylinder. Therefore, in the so-called gas-spring type driving tool, the cooling efficiency of the main motor and other electrical components can be improved by driving the sub-motor.

Hereinafter, a first embodiment of the present disclosure will be described with reference to FIGS. 1 to 14. As one example of a driving tool 1, a gas-spring type driving tool that uses a gas pressure within a pressure accumulation chamber as a driven member's driving thrust will be described as an example. In the following description, a driving direction of a driven member will be referred to as a downward direction and a counter-driving direction will be referred to as an upward direction. A user of the driving tool 1 is positioned approximately to a right side of the driving tool 1 in FIG. 1. A side in front of the user will be referred to as a rearward direction, and an opposite side of the user will be referred to as a forward direction. Left-right direction will be determined with reference to a position of the user.

Figure 2:
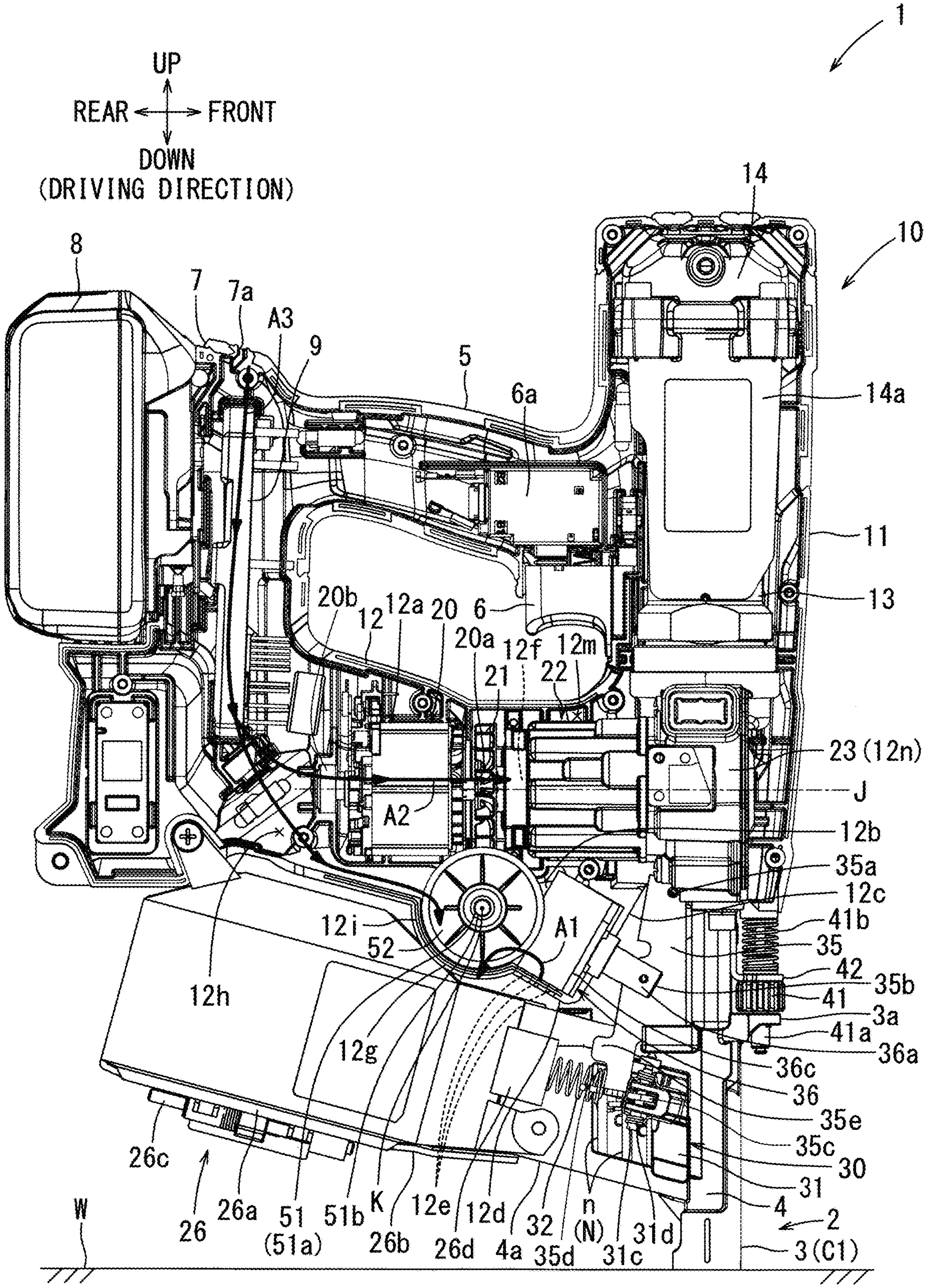
FIG. 2 is a right side view of the driving tool with a right housing removed.
Figure 3:
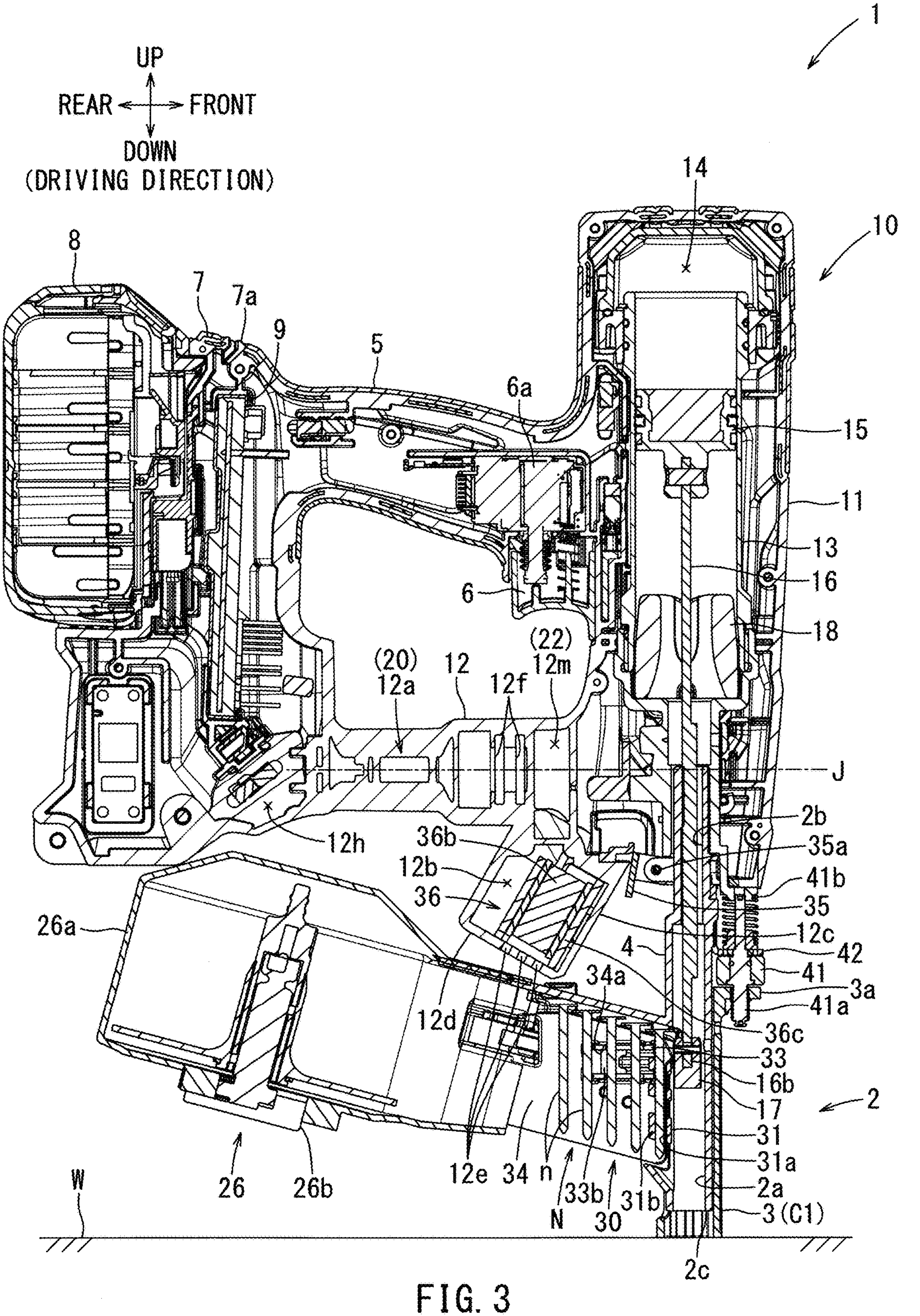
FIG. 3 is a cross-sectional view of the driving tool as seen from the right when a driver is in a standby position.

As shown in FIG. 2 and FIG. 3, the driving tool 1 has a tool body 10 and a main body housing 11 covering the tool body 10. The main body housing 11 accommodates a cylinder 13 extending in an up-down direction. A piston 15 is accommodated in the cylinder 13 so as to be able to reciprocate up and down. A long driver 16 extending in the up-down direction is connected to a lower side of the piston 15. A pressure accumulation chamber 14 communicates with an upper end of the cylinder 13. The pressure accumulation chamber 14 is filled with compressed gas, such as, for example, air. A gas pressure within the pressure accumulation chamber 14 acts as a thrust force that biases an upper surface of the piston 15 to cause the piston 15 to move downward.

Figure 6:
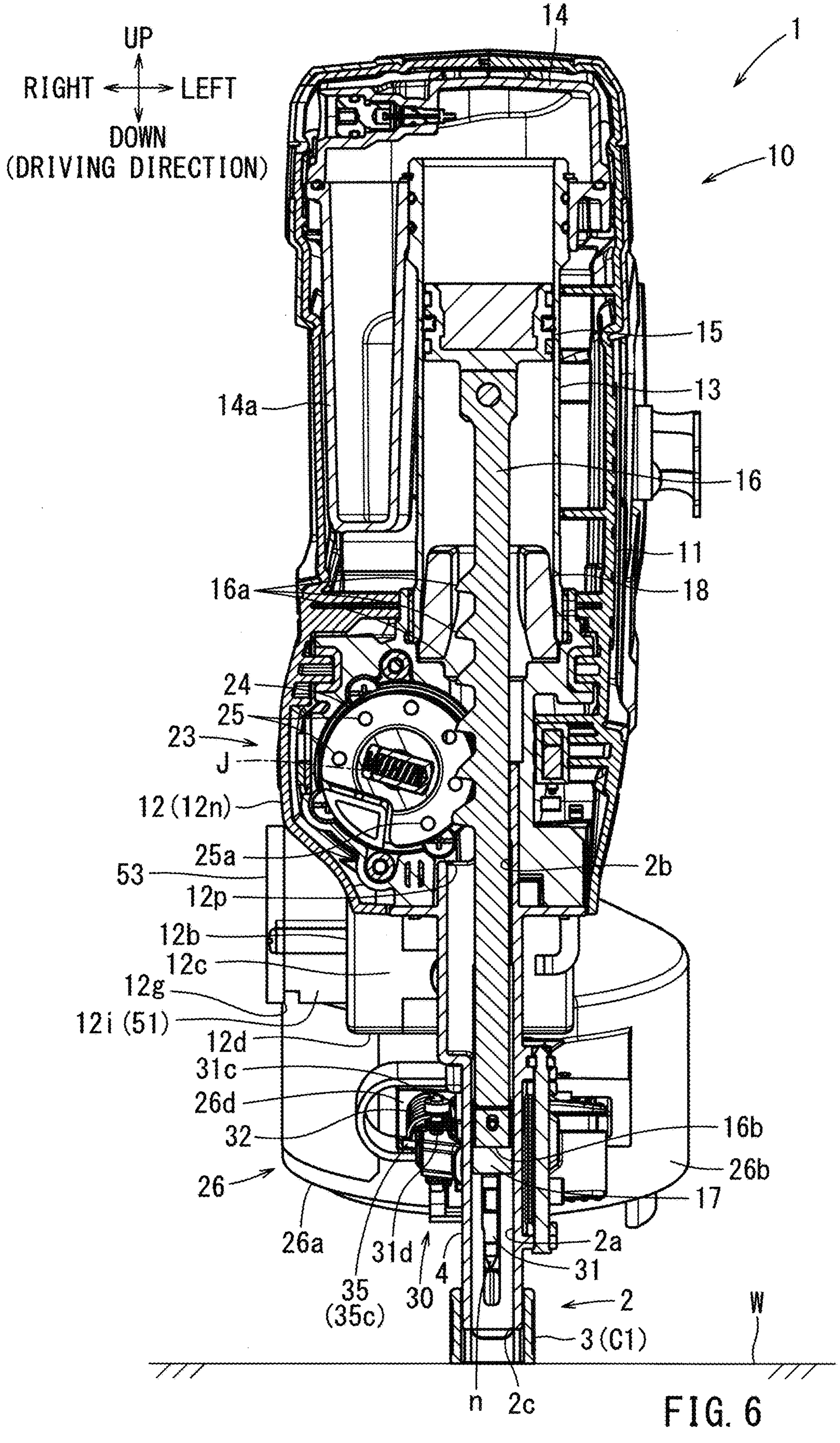
FIG. 6 is a vertical sectional view of a tool body when the driver is in the standby position.
Figure 7:
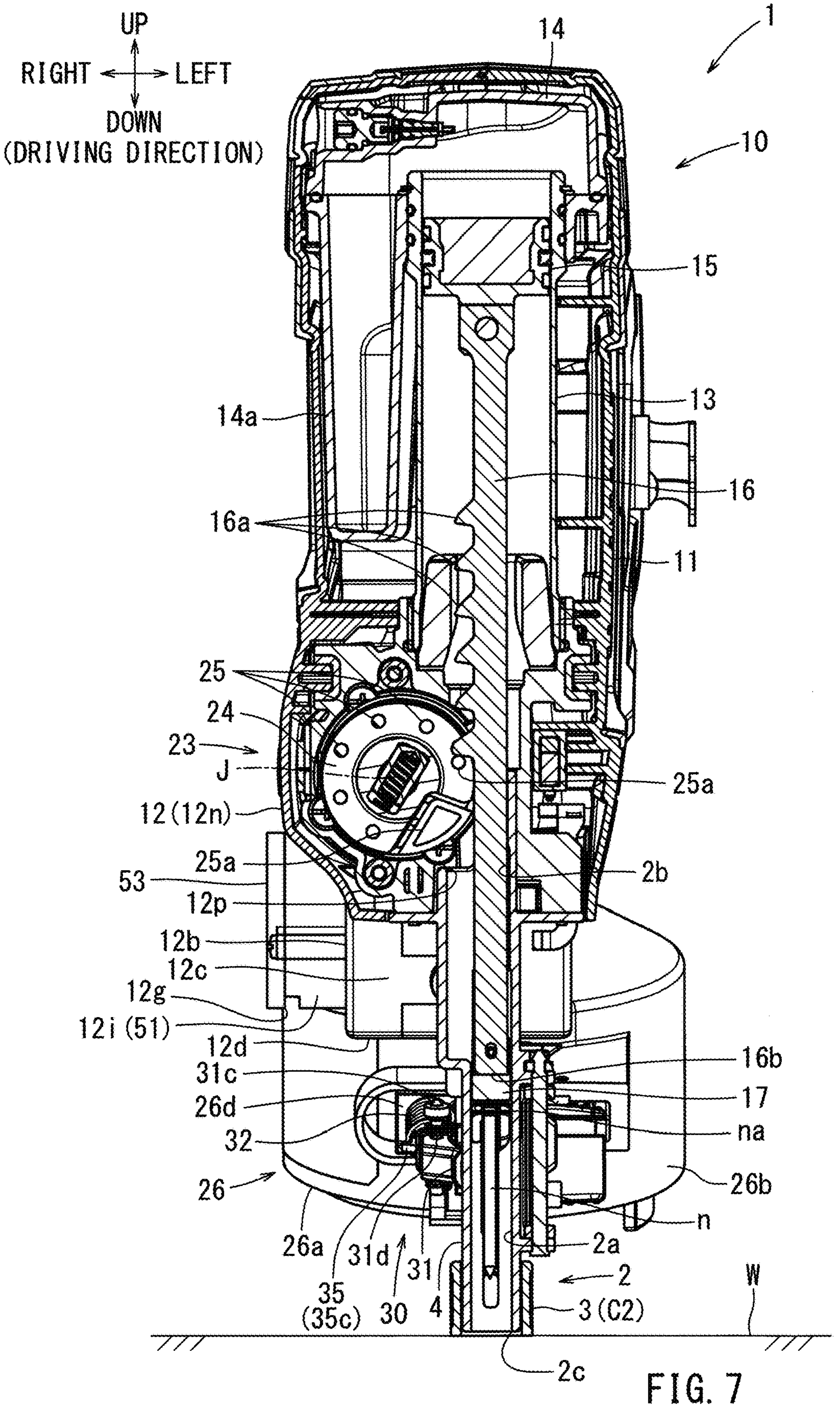
FIG. 7 is a vertical sectional view of the tool body when loading the driven members into a driving channel.

As shown in FIGS. 6 and 7, the pressure accumulation chamber 14 includes an air chamber **14*a* extending downward from a right side of the pressure accumulation chamber 14. The air chamber 14*a* extends downward along the right side of the cylinder 13. The air chamber 14*a* overlaps a lift mechanism 23 (described below) in the left-right direction and is located above the lift mechanism 23. By providing the air chamber 14*a* to the right of the cylinder 13, a capacity of the pressure accumulation chamber 14 may be increased while preventing the tool body 10** from increasing in size in the up-down direction.

As shown in FIGS. 1 to 7, a driving nose 2 is provided at a lower part of the tool body 10. The driving nose 2 includes a driver guide 4 extending in a substantially up-down direction. Driving channels **2*a* and 2*b* extending in the up-down direction are defined inside the driver guide 4. An upper driving channel 2*b* and a lower driving channel 2*a* are communicate with each other. The upper driving channel 2*b* is formed to have a substantially rectangular shape in a size to allow the driver 16 to be inserted in the up-down direction. An upper end of the upper driving channel 2*b* communicates with a lower part of the cylinder 13. The lower driving channel 2*a* is formed to have a substantially cylindrical shape that is wider than the upper channel 2*b*. The lower driving channel 2*a* has substantially the same or slightly larger diameter than a cylindrical striker 17 attached to an end (lower end) 16*b* of the driver 16. A lower end of the lower driving channel 2*a* opens downward as an ejection port 2*c***.

As shown in FIGS. 2 to 7, the driving nose 2 has a contact arm 3 in contact with a workpiece W to be driven. The contact arm 3 is movable in the up-down direction between a lower position C1 and an upper position C2 with respect to the driver guide 4. The contact arm 3 is biased toward the lower position C1 by a compression spring **41*b* provided in a front part of the tool body 10. With the lower end of the contact arm 3 in contact with the workpiece W, the tool body 10 is brought even closer to the workpiece W. As a result, the contact arm 3 is pushed by the workpiece W and moves from the lower position C1 to the upper position C2. The lower end of the contact arm 3 moves to substantially the same position as the ejection port 2***c* when in the upper position C2.

As shown in FIGS. 6 and 7, the lower part of the driver 16 enters the driving channels 2*a* and 2*b*. The driver 16 moves downward by the gas pressure in the pressure accumulation chamber 14 acting on the upper surface of the piston 15. A striker 17 attached to an end 16*b* of the driver 16 strikes a head na of one driven member n loaded in the driving channel 2*a* when shifted to the striking position. The driven member n moves downward in the driving channel 2*a* and is ejected from the ejection port 2*c*. The driven member n is driven into the workpiece W. A substantially cylindrical cushion 18 is provided on an interior bottom side of the cylinder 13 to absorb an impact of the piston 15 at its bottom dead center.

As shown in FIGS. 6 and 7, a plurality of rack teeth (engaged portions) 16*a* protruding to right are provided on a right side of the driver 16. In the present embodiment, six rack teeth 16*a* are aligned in the up-down direction, which is a longitudinal direction of the driver 16. Each rack tooth 16*a* is provided in a substantially triangular shape with a bottom of the triangle oriented downward, which is the driving direction, in the front view. The bottom of the rack teeth 16*a* engages with an engaging portion 25 of a lift mechanism 23.

As shown in FIGS. 1 to 4, a grip 5, which can be grasped by the user, extends rearward from a rear side of the tool body 10. A trigger 6, which is pulled by the user's fingertip to operate, is located on a front lower side of the grip 5. A trigger switch 6*a* is provided inside the grip 5, which switches from an OFF state to an ON state in response to the pulling operation of the trigger 6. The pulling operation of the trigger 6 is allowed when the driving nose 2 is pressed against the workpiece W and moves from the lower position C1 to the upper position C2 (FIG. 7).

As shown in FIGS. 1 to 4, a battery mount 7 extending in the up-down direction is provided on a rear side of the grip 5. A battery 8 can be removably attached to the battery mount 7. The battery 8 can be removed from the battery mount 7 and repeatedly recharged with a separately prepared charger. The battery 8 can be repurposed as a power source for other power tools. The battery 8 supplies power to a main motor 20 and other components described below.

Figure 4:
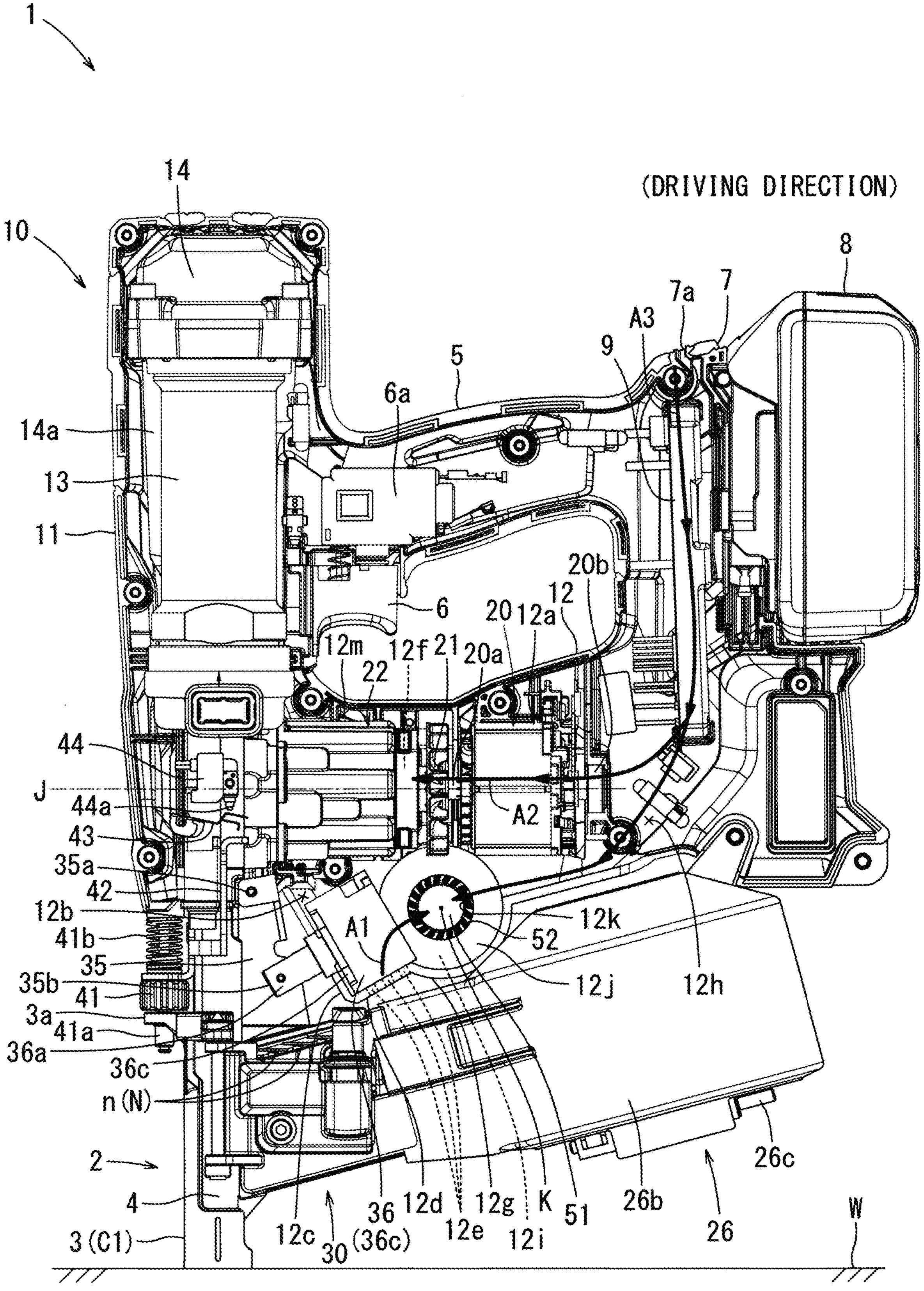
FIG. 4 is a left side view of the driving tool with a left housing removed.
Figure 5:
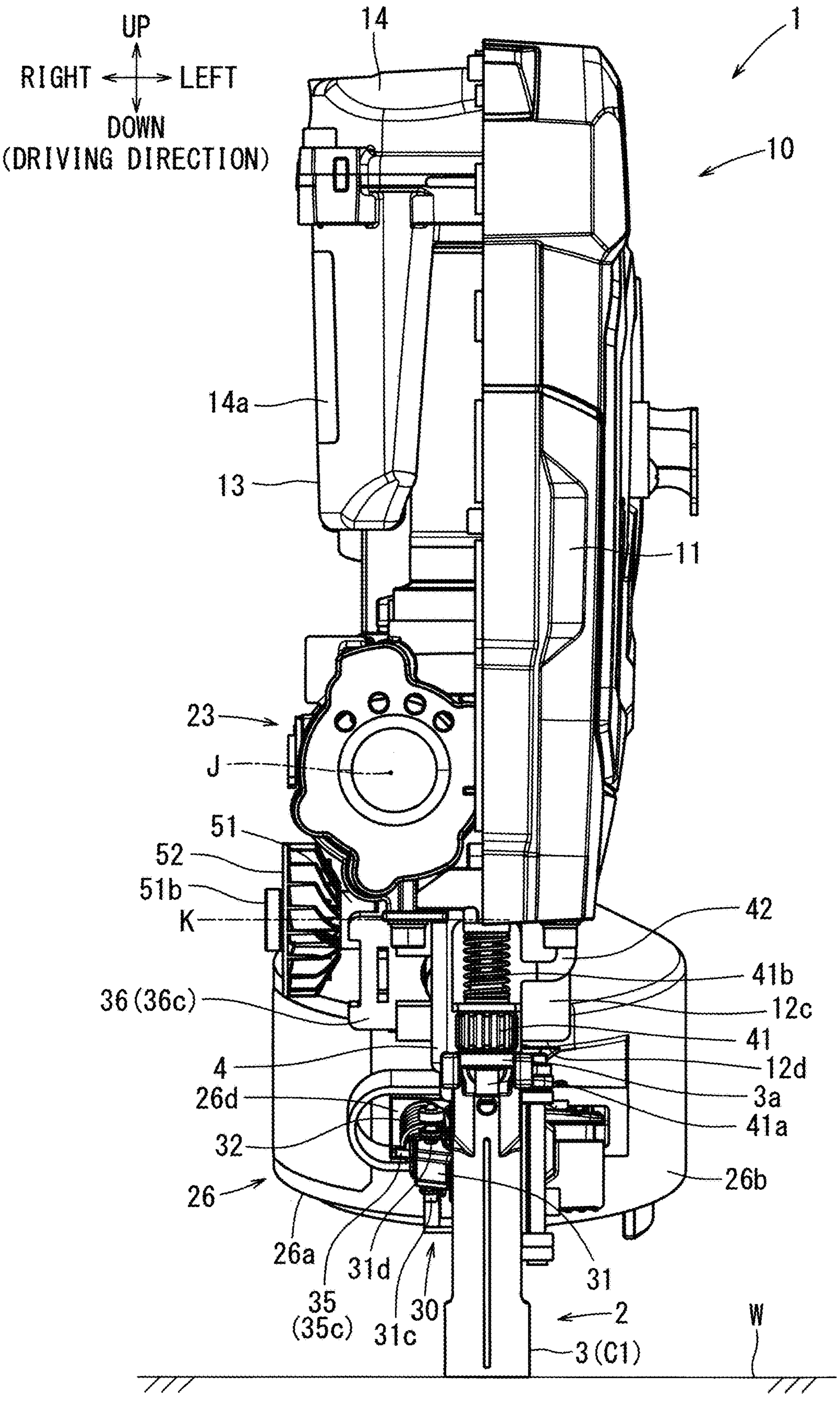
FIG. 5 is a right side view of the driving tool with the right housing removed.

As shown in FIGS. 2 to 4, the battery mount 7 accommodates a controller 9 that primarily controls the driving of the main motor 20. The controller 9 is provided with a control board accommodated in a shallow-bottomed rectangular box-shaped case. The controller 9 is disposed in front of the battery 8 mounted on the battery mount 7. The controller 9 is disposed with a longest side extending substantially in the up-down direction and a shortest side extending substantially in a front-rear direction. On an upper side of the battery mount 7 and above the controller 9, an air intake port 7*a* is provided which passes through both inside and outside of the battery mount 7.

As shown in FIG. 3 and FIG. 4, the main body housing 11 includes a substantially cylindrical mechanism case 12 (motor housing) that extends in the front-rear direction below the grip 5. A rear portion of the mechanism case 12 is connected to a lower portion of the battery mount 7. A main motor housing chamber 12*a* configured to accommodate the main motor 20 is provided at a rear portion of the mechanism case 12. A gear housing chamber 12*m* configured to accommodate a planetary reduction mechanism 22 is provided in front of the main motor housing chamber 12*a*. A first exhaust port 12*f* passing through inside and outside of the mechanism case 12 is provided on right and left sides of the gear housing chamber 12*m*. As shown in FIG. 2, a lifter housing chamber 12*n* configured to accommodate the lift mechanism 23 is provided in front of the gear housing chamber 12*m*. The main motor housing chamber 12*a*, the gear housing chamber 12*m*, and the lifter housing chamber 12*n* are aligned in an extending direction of the output shaft axis J, which extends in the front-rear direction. The grip 5, the battery mount 7, and the mechanism case 12 cooperate to form a loop shape.

As shown in FIG. 3, the mechanism case 12 has a solenoid housing chamber 12*b* below the main motor housing chamber 12*a* and the gear housing chamber 12*m*. The solenoid housing chamber 12*b* houses the solenoid 36 described below. As shown in FIG. 2, the mechanism case 12 has a sub-motor housing chamber 12*i* below the main motor housing chamber 12*a* and the gear housing chamber 12*m* and behind the solenoid housing chamber 12*b*. The sub-motor housing chamber 12*i* houses a sub-motor 51 described below.

As shown in FIG. 2 and FIG. 4, the solenoid housing chamber 12*b* and the sub-motor housing chamber 12*i* communicate with each other. The solenoid housing chamber 12*b* and the sub-motor housing chamber 12*i* are partitioned in the up-down direction with respect to the main motor housing chamber 12*a* and gear housing chamber 12*m* by a lower side of the main motor housing chamber 12*a* and a lower side of the gear housing chamber 12*m*. A rear part of the solenoid housing chamber 12*b* communicates with the main motor housing chamber 12*a* through a communication passage 12*h* provided behind the main motor housing chamber 12*a* via the sub-motor housing chamber 12*i*. The lower part of the battery mount 7 also communicates with the main motor housing chamber 12*a* and the sub-motor housing chamber 12*i* via the communication passage 12*h*. The main motor housing chamber 12*a* is communicates with the gear housing chamber 12*m* in the front-rear direction.

As shown in FIGS. 1 to 4, the solenoid housing chamber 12*b* is formed in a substantially rectangular box shape. The solenoid 36 is accommodated in a front part of solenoid housing chamber 12*b*. A plunger 36*a* of the solenoid 36 extends in a downwardly inclined direction toward the front with respect to the output shaft axis J. The solenoid housing chamber 12*b* has a first wall 12*c* on a front side facing the driving nose 2 and a second wall 12*d* on a lower side facing a magazine 26, which will be described below. The plunger 36*a* protrudes from a center of the first wall 12*c* out of the solenoid housing chamber 12*b*. The second wall 12*d* has an air intake port 12*e* that passes through the solenoid housing chamber 12*b* from inside to outside. The air intake port 12*e* is aligned with the solenoid 36 one above the other. The specific configuration of the solenoid 36 will be described in detail later.

As shown in FIG. 2 and FIG. 3, the main motor 20 has an output shaft 20*a* extending in the front-rear direction on the output shaft axis J. A rear part of the output shaft 20*a* is rotatably supported by a bearing 20*b*. A front part of the output shaft 20*a* is rotatably supported by an unshown bearing in a planetary reduction mechanism 22. A fan 21 is mounted at the front part of the output shaft 20*a* and behind the planetary reduction mechanism 22. As the fan 21 integrally rotates with the output shaft 20*a*, cooling air flows from rear to front in the main motor housing chamber 12*a*. Three planetary gear trains may be used for the planetary reduction mechanism 22. The rotary drive of the output shaft 20*a* of the main motor 20 is decelerated by the planetary reduction mechanism 22 and transmitted to the lift mechanism 23.

As shown in FIGS. 6 and 7, the lift mechanism 23 is located on a right side of the driving nose 2. The lift mechanism 23 moves the driver 16 and the piston 15 upward against an air pressure in the pressure accumulation chamber 14. The lift mechanism 23 has a wheel 24 that can rotate about the output shaft axis J. The wheel 24 is rotatable in a counterclockwise direction when viewed from the front and is restricted to rotate in a clockwise direction. A plurality of engaging portions 25 are provided along an outer peripheral edge of the wheel 24. In the present embodiment, for example, six engaging portions 25 are spaced apart in the circumferential direction of the wheel 24. For example, a columnar pin extending in the front-rear direction may be used for the engaging portions 25. As the wheel 24 rotates, each engaging portion 25 moves about the output shaft axis J.

As shown in FIGS. 6 and 7, a left portion of the wheel 24 enters the driving channel 2*b* of the driver guide 4 through a window 12*p* formed in a left portion of the lifter housing chamber 12*n*. Each engaging portion 25 of the wheel 24 engages with a bottom of each rack tooth 16*a* of the driver 16 in the driving channel 2*b*. With at least one of the engaging portions 25 engaged with the bottom of any one of the rack teeth 16*a*, the wheel 24 rotates in the counterclockwise direction when viewed from the front. This causes the driver 16 and piston 15 to move upward. The upward movement of the piston 15 increases a gas pressure in the pressure accumulation chamber 14.

As shown in FIG. 4, a dial adjuster 41 is provided at a front side of the driving nose 2. The adjuster 41 has a rotary shaft 41*a* extending in an up-down direction. The rotary shaft 41*a* is integrally rotatable with the adjuster 41 and movable in the up-down direction. An upper part of the contact arm 3 is provided with an adjuster connecting portion 3*a* to be connected to the adjuster 41. The contact arm 3 is integrally movable with the adjuster 41 in the up-down direction. By rotating the adjuster 41 around its axis, an up-down position of the contact arm 3 can be adjusted. The adjuster 41 has a compression spring 41*b* that is disposed on an outer peripheral side of the rotary shaft 41*a* and supported by the main body housing 11. The compression spring 41*b* biases the adjuster 41 and contact arm 3 downward. Therefore, the contact arm 3 is normally positioned in the lower position C1.

As shown in FIG. 4, a contact plate 42 is integrally connected to an upper portion of the adjuster 41. A plate spring 43 and a switch 44 are provided above the contact plate 42. When the contact arm 3 moves from a lower position C1 to an upper position C2 (see FIG. 7), the contact plate 42 also moves upward via the adjuster 41. An upper end of the contact plate 42 pushes a protruding pin 44*a* of the switch 44 via the spring 43. As a result, the switch 44 is turned ON and transmits an ON signal to a controller 9. When the ON signal is transmitted to the controller 9, the pulling operation of the trigger 6 is allowed. When the contact arm 3 is in the lower position C1, the contact plate 42 is not moved upward and the protruding pin 44*a* of the switch 44 is not pressed. Therefore, the switch 44 is not transmitting the ON signal and the pulling operation of the trigger 6 is not allowed.

As shown in FIGS. 1 to 4, a substantially cylindrical magazine 26 is provided behind the driving nose 2. The magazine 26 is provided in an orientation in which its axial direction of the substantially cylindrical shape is substantially oriented in the up-down direction. The magazine 26 is provided in a halved structure with a right section 26*a* and a left section 26*b*. A support shaft 26*c* is provided between a left end of a lower surface of the right section 26*a* and a right end of a lower surface of the left section 26*b*. The left section 26*b* rotates around the support shaft 26*c* to open and close with respect to the right section 26*a*. By opening the left section 26*b*, a connected driven member N with a plurality of driven members n connected each other, can be loaded into the magazine 26. By closing the left section 26*b*, the connected driven member N can be held within the magazine 26. A driver guide 4 has a flat feed guide portion 4*a* extending rearward from the driving nose 2. A front portion of the right section 26*a* of the magazine 26 is connected to and supported by a feed guide portion 4*a*. A rear portion of the right section 26*a* of the magazine 26 is connected to and supported by the main body housing 11 in an area behind the mechanism case 12.

Figure 8:
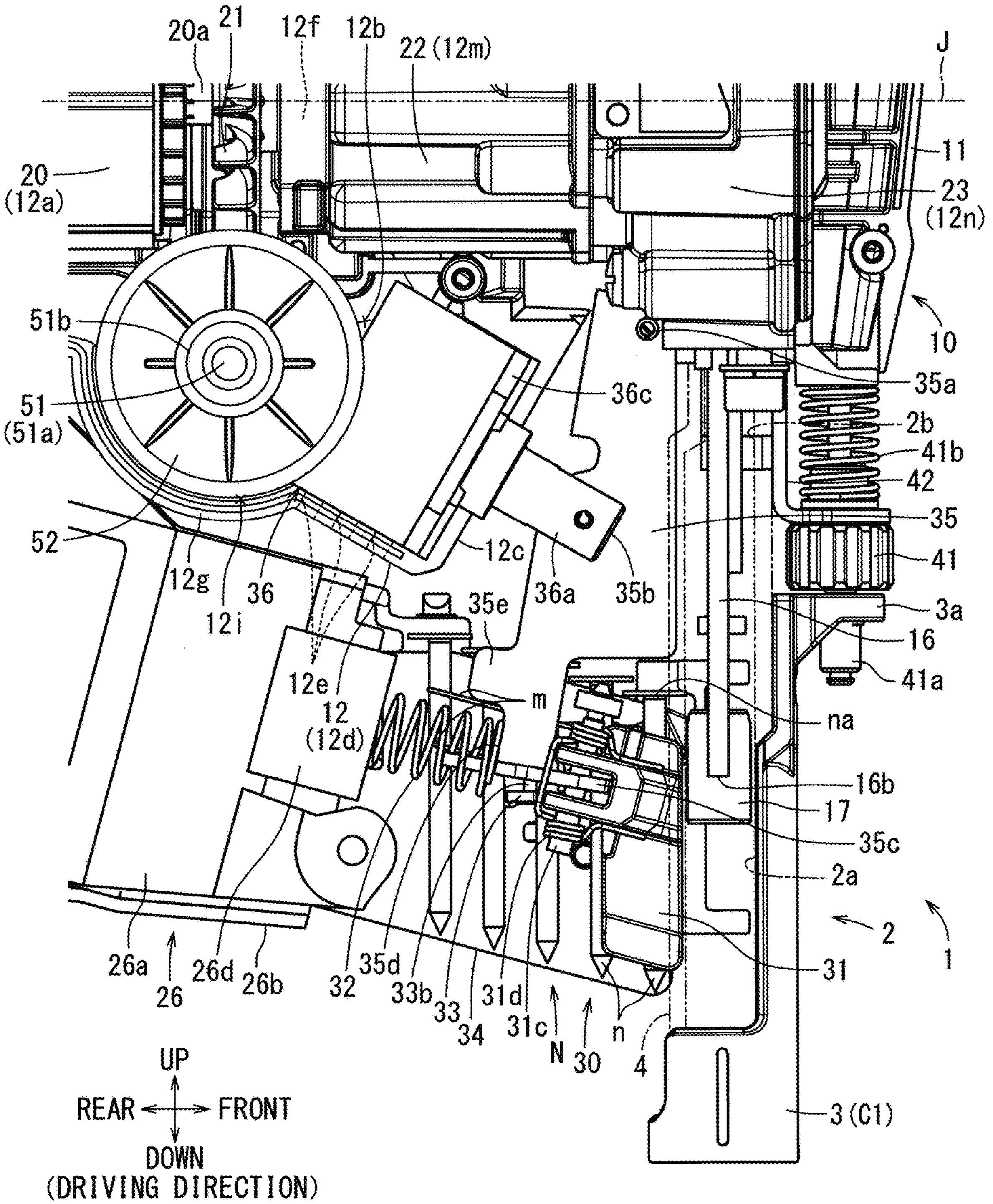
FIG. 8 is an enlarged right side view of the driving tool with the right housing and the driver guide removed when the driver is in the standby position.
Figure 9:
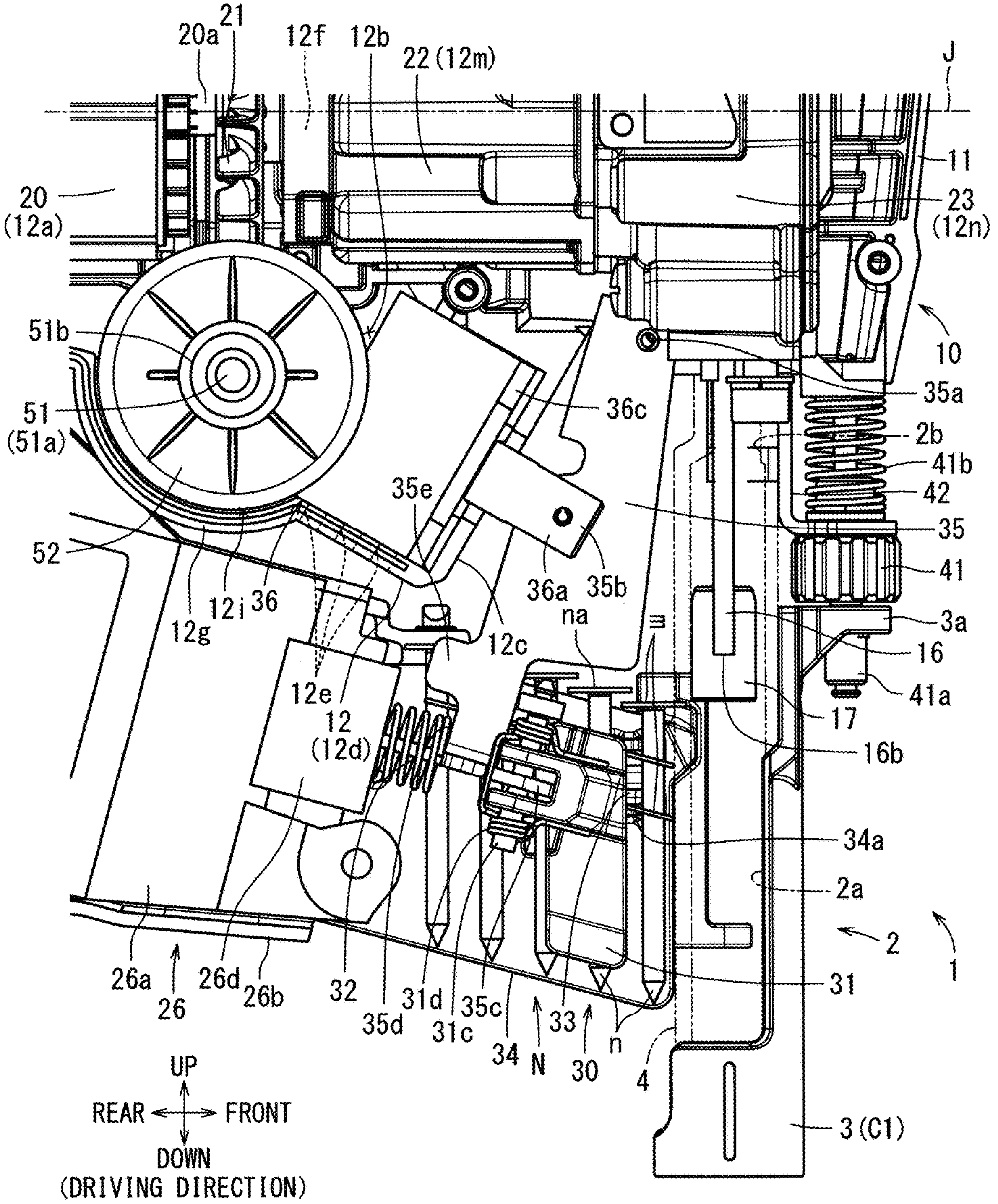
Figure 10:
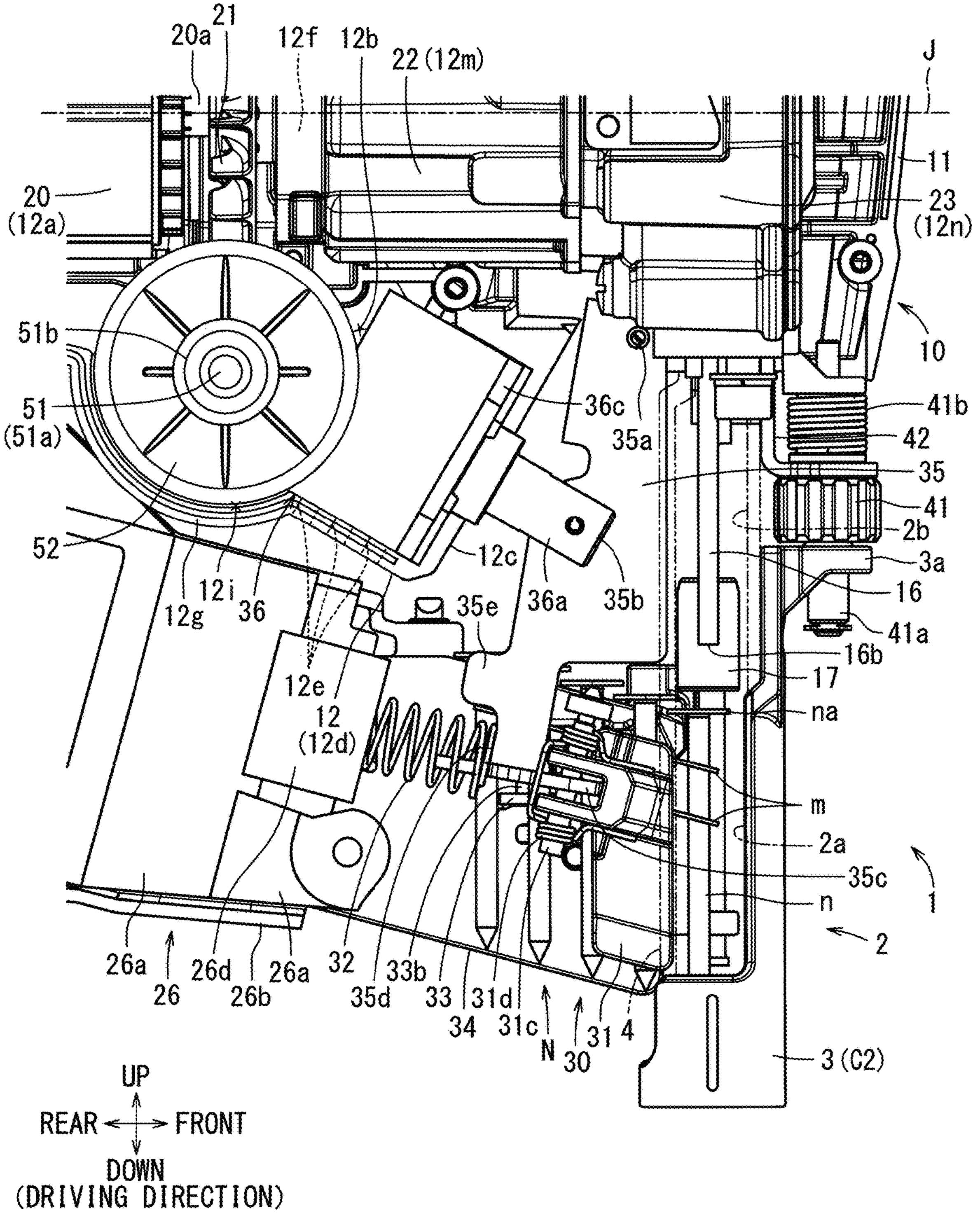
FIG. 10 is an enlarged right side view of the driving tool with the right housing and the driver guide removed when driven members are loaded into the driving channel.

As shown in FIGS. 8 to 10, a connected driven member N, which is referred to as a so-called coil nail, includes a plurality of driven members n and a connecting member m that connects each driven member n. The driven member n may be, for example, a nail with a circular head na. The connecting member m may be, for example, a metal wire. The connecting member m connects a plurality of driven members n in line at predetermined intervals in a direction substantially orthogonal to the longitudinal direction. The connected driven member N is accommodated within the magazine 26 in a spirally wound state. The driven member n at one end of the connected driven member N is guided forward from the magazine 26 and held by the feed mechanism 30 provided between the magazine 26 and the driving nose 2.

As shown in FIGS. 8 to 13, the feed mechanism 30 includes a feed claw 31 configured to feed the driven members n forward toward the driving channel 2*a*. The feed mechanism 30 includes a biasing member 32 that biases the feed claw 31 forward. The biasing member 32 may be, for example, a coiled compression spring. A spring receiving portion 26*d* is provided at front of the right section 26*a* of the magazine 26, which holds the rear end of the compression spring 32. The feed mechanism 30 has a solenoid 36 to move the feed claw 31. As shown in FIG. 2, electric power from the battery 8 to the solenoid 36 is supplied or interrupted in response to a signal from the controller 9. In the OFF state when the electric power supply to the solenoid 36 is interrupted, the feed claw 31 is biased forward to the driving channel 2*a* by the compression spring 32. When power is supplied to the solenoid 36 to be in the ON state, the feed claw 31 moves rearward to the magazine 26 against the biasing force of the compression spring 32.

As shown in FIG. 2, the solenoid 36 is accommodated in a solenoid housing chamber 12*b* provided in the mechanism case 12 above the magazine 26. In other words, the solenoid 36 is not provided in the magazine 26, nor in the feed channel of the driven members n formed between the magazine 26 and the driver guide 4 in the front-rear direction.

Figure 14:
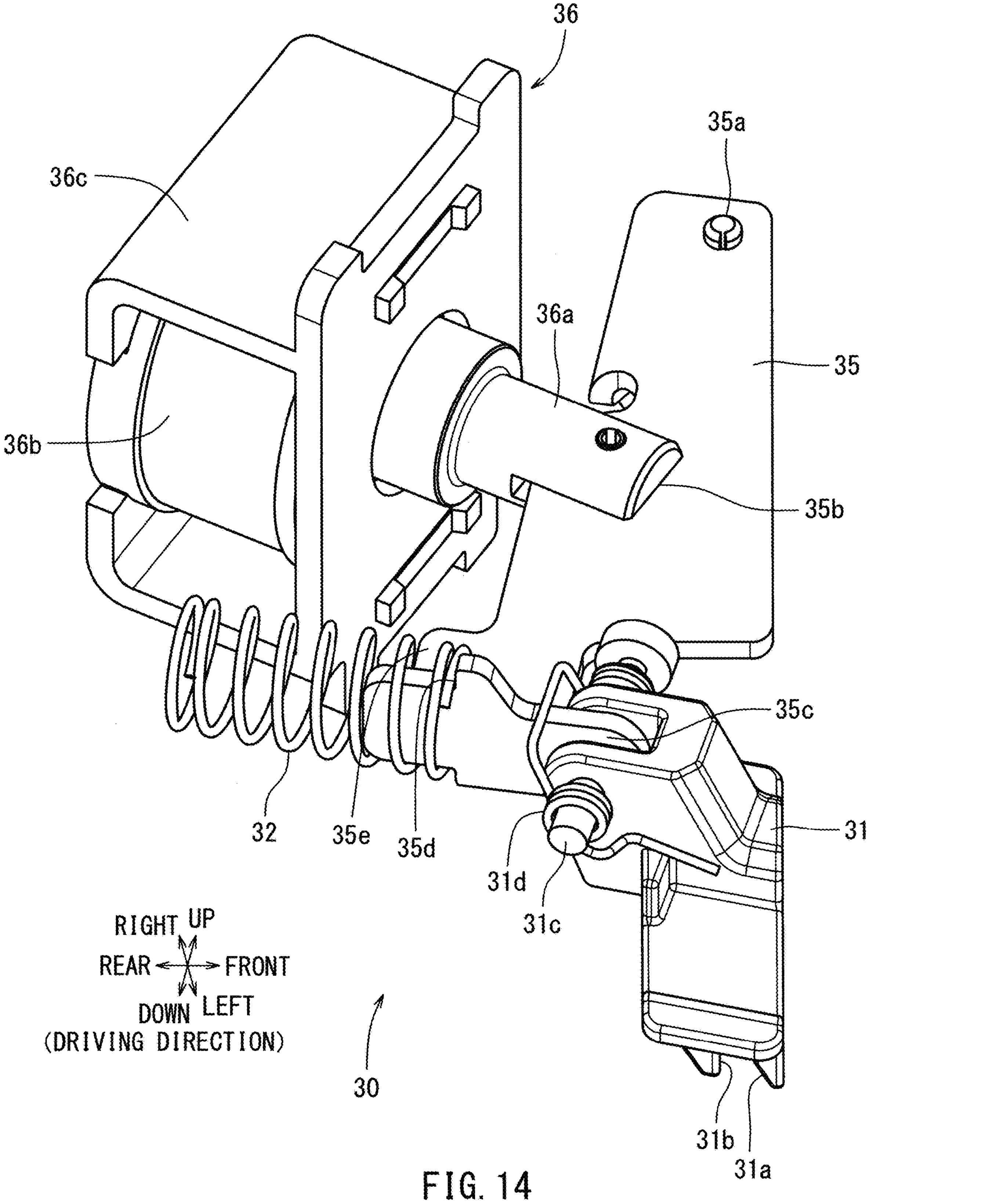
FIG. 14 is a perspective view of the solenoid, a power transmitting member, and a feed claw.

As shown in FIGS. 10 and 14, the solenoid 36 has a rectangular box-shaped holder 36*c* and a plunger 36*a* protruding forward from the holder 36*c*. A front surface of the holder 36*c* is formed with a through hole through which the plunger 36*a* is inserted. A lower side and an upper side of the holder 36*c* are open. A coil 36*b* is accommodated in the holder 36*c*. The plunger 36*a* is inserted into the coil 36*b*. The coil 36*b* is adjacent to an air intake port 12*e* formed in a second wall 12*d* of the solenoid housing chamber 12*b*.

As shown in FIGS. 10 and 14, the feed mechanism 30 includes a power transmitting member 35 that is moved by the solenoid 36. The feed claw 31 moves in the front-rear direction in conjunction with a movement of the power transmitting member 35. The power transmitting member 35 is provided on a plate-like member extending substantially in the up-down direction. At an upper end of the power transmitting member 35, a rotation supporting portion 35*a* is provided, which is a center of rotation of the power transmitting member 35. The rotation supporting portion 35*a* is rotatably supported by the driver guide 4 via a shaft member extending in the left-right direction.

As shown in FIGS. 10 and 14, a claw connecting portion 35*c* is provided at a lower end of the power transmitting member 35. The claw connecting portion 35*c* is connected to a rear side of the feed claw 31. On a rear side of the claw connecting portion 35*c*, a spring receiving portion 35*d* is provided to receive a front end of the compression spring 32. The power transmitting member 35 and the feed claw 31 are biased forward by the compression spring 32 via the spring receiving portion 35*d*. The power transmitting member 35 has a thick-walled portion 35*e* behind the claw connecting portion 35*c*. The thick-walled portion 35*e* protrudes rearwardly from the spring receiving portion 35*d*. Providing the thick-walled portion 35*e* improves the rigidity of the power transmitting member 35 against the biasing force of the compression spring 32 and the driving force of the solenoid 36.

As shown in FIGS. 10 and 14, the power transmitting member 35 includes a plunger connecting portion 35*b* that is connected to a front end of the plunger 36*a*. The plunger connecting portion 35*b* is provided between the rotation supporting portion 35*a* and the claw connecting portion 35*c* in the up-down direction. For example, the distance from the rotation supporting portion 35*a* to the plunger connecting portion 35*b* is approximately half the distance from the rotation supporting portion 35*a* to the claw connecting portion 35*c*. Therefore, the amount of movement of the plunger 36*a* is approximately half the amount of movement of the feed claw 31.

Figure 11:
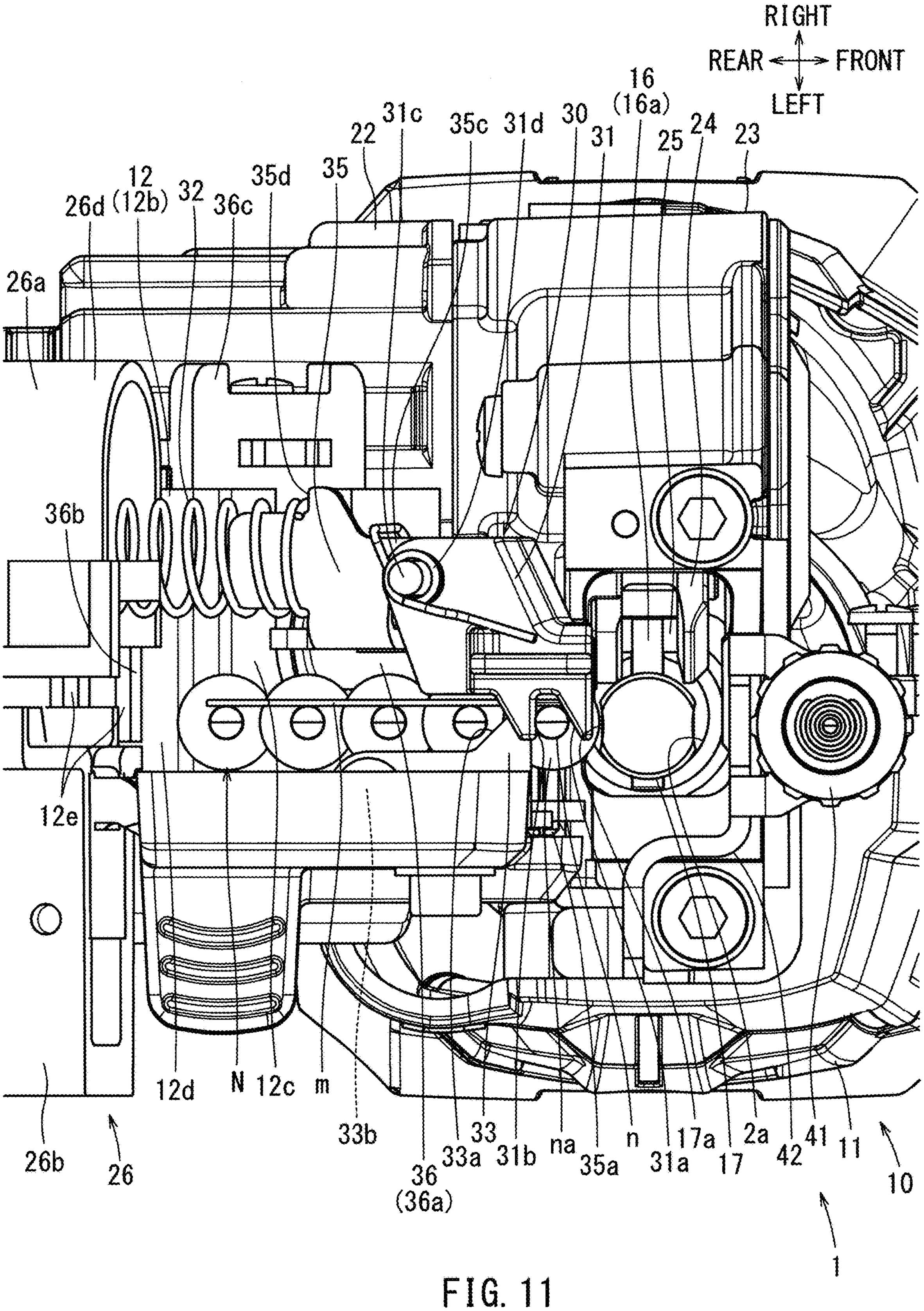
FIG. 11 is an enlarged lower view of the driving tool with the right housing and the driver guide removed when the driver is in the standby position.

As shown in FIGS. 11 and 14, a left end of the feed claw 31 is formed to have a substantially U-shape. A feed inclined surface 31*a* is formed on a front of a left end of the feed claw 31. The feed inclined surface 31*a* is inclined forward as it extends leftward with its left rear side as a direction perpendicular to a plane. A receiving surface 31*b* opposite to the feed inclined surface 31*a* is provided at a rear of the left end of the feed claw 31. The receiving surface 31*b* is oriented forward and extends substantially horizontal in a left-right direction. A right lower part of the feed claw 31 is rotatably connected to the claw connecting portion 35*c* of the power transmitting member 35 via the rotation shaft 31*c* extending in the up-down direction. The feed claw 31 has a torsion spring 31*d* that biases the feed claw 31 around an axis of the rotation shaft 31*c*. The torsion spring 31*d* biases the feed claw 31 in a clockwise direction when viewed from below.

Figure 12:
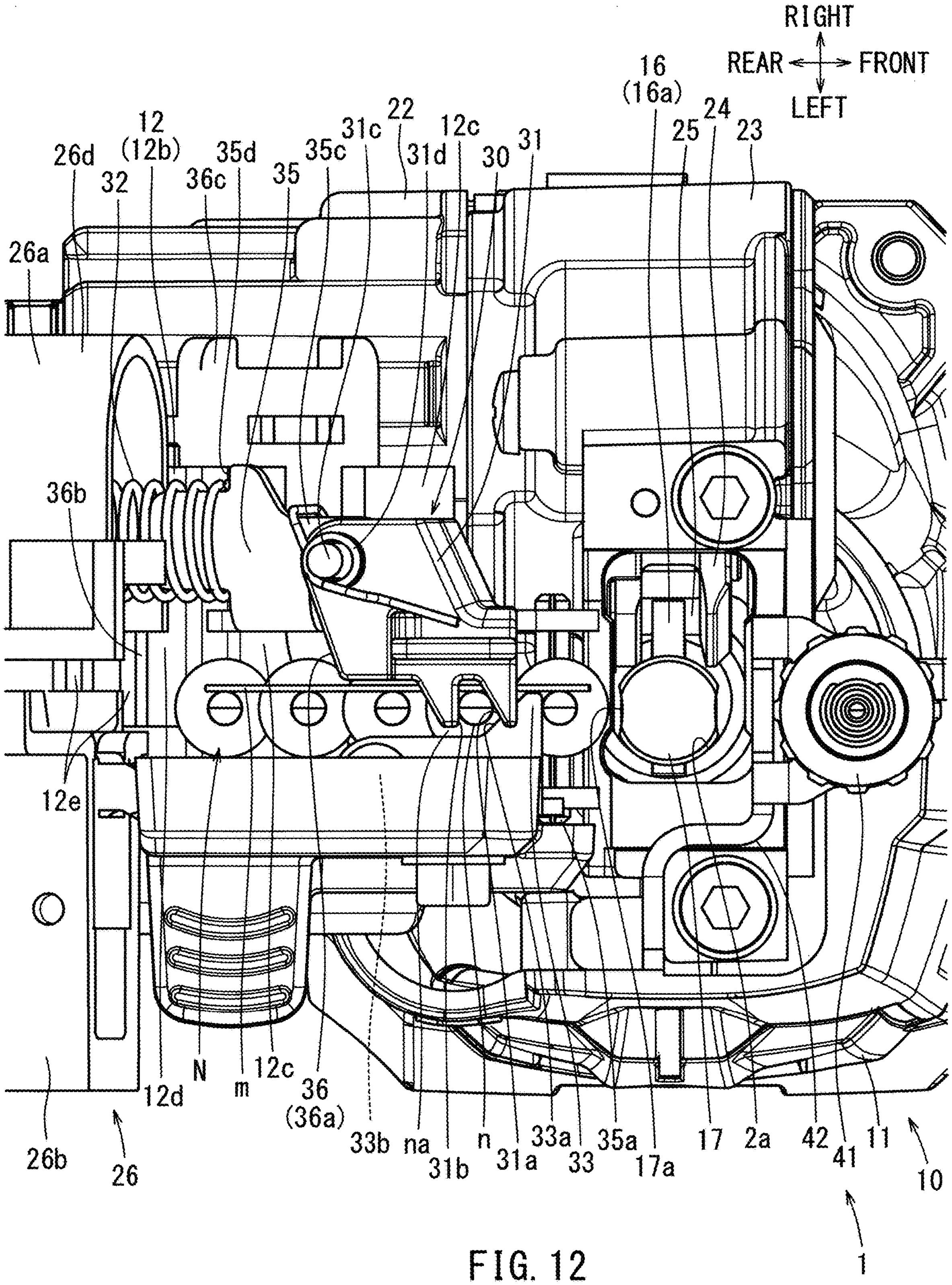
Figure 13:
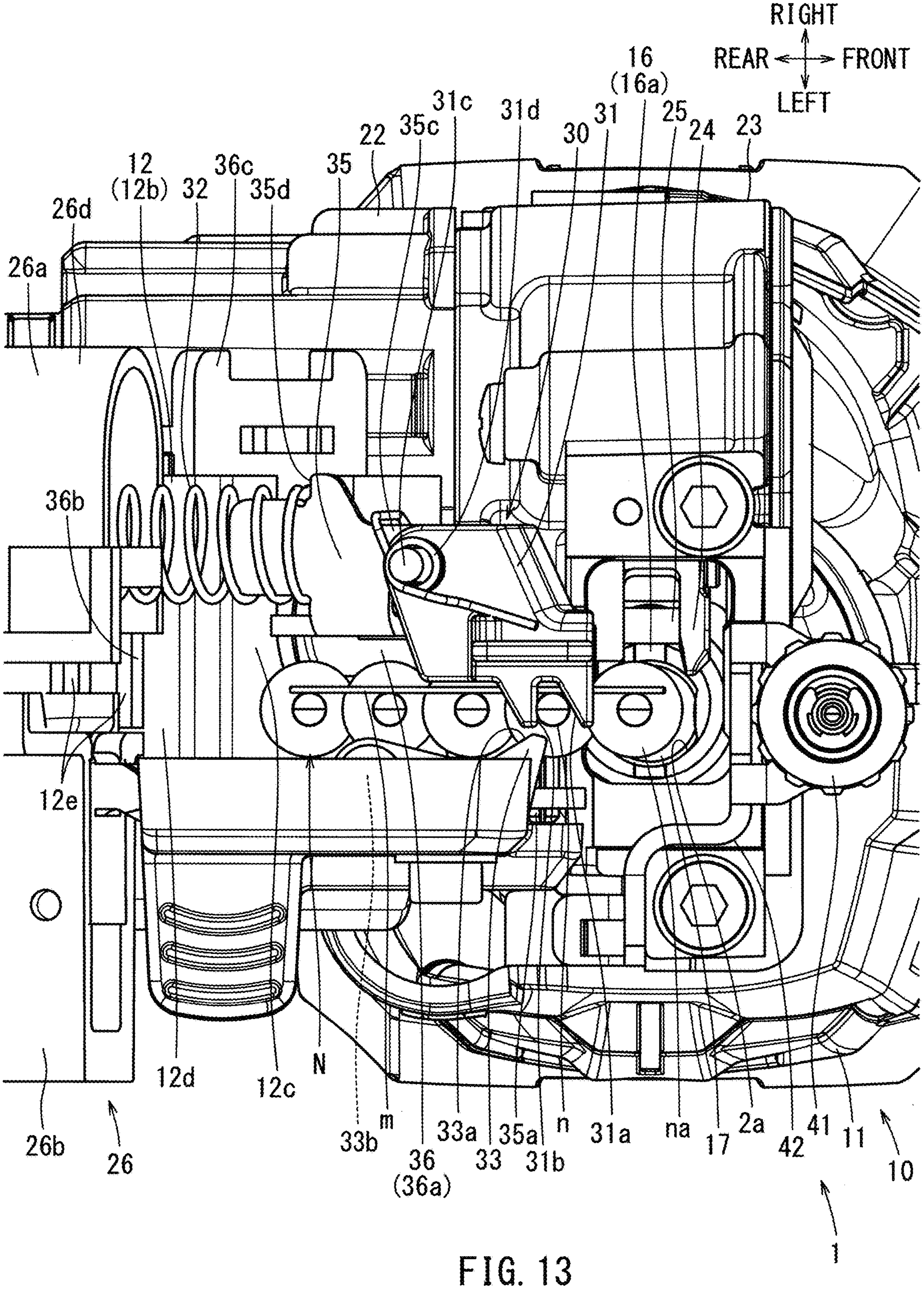
FIG. 13 is an enlarged lower view of the driving tool with the right housing and the driver guide removed when the driven members are loaded into the driving channel.

As shown in FIGS. 11 to 13, the feed mechanism 30 has a non-return claw 33 that prevents the driven member n fed forward by the feed claw 31 from returning rearward from the driving channel 2*a*. A front portion of the non-return claw 33 is provided with a non-return inclined surface 33*a*. The non-return inclined surface 33*a* inclines forward as it extends toward the right. As shown in FIG. 1, a plate-like guide member 34 extending in the front-rear and up-down directions is provided between the driving channel 2*a* and the magazine 26 in the front-rear direction. The guide member 34 extends to the left of the feed guide portion 4*a* and substantially parallel to the feed guide portion 4*a*. As shown in FIG. 11, a rear part of the non-return claw 33 is rotatably connected to the guide member 34 via a rotary shaft 33*b* (see FIG. 8) extending in the up-down direction. The non-return claw 33 is biased in a counterclockwise direction as viewed from below (see FIG. 11) by a spring (not shown).

As shown in FIG. 1, a feed channel is formed to feed the driven member n from the magazine 26 to the driving channel 2*a* between the feed guide portion 4*a* and the guide member 34 in the left-right direction. The feed claw 31 is inserted into a hole 4*b* that passes through the feed guide portion 4*a* in the left-right direction and protrudes from the right to the left toward the feed channel. The non-return claw 33 is inserted into a hole 34*a* shown in FIG. 9, which passes through the feed guide portion 4*a* in the left-right direction and protrudes from the left to the right toward the feed channel.

As shown in FIGS. 1 and 2, a sub-motor housing chamber 12*i* for accommodating a sub-motor 51, is formed in a substantially cylindrical shape with the left-right direction as its axial direction. An output shaft 51*a* of the sub-motor 51 extends in the left-right direction on an output shaft axis K, which is substantially orthogonal to an output shaft axis J as well as the driving direction. The sub-motor 51 locates in between the main motor 20 and the magazine 26 in the up-down direction. It is necessary to provide a space between the main motor 20 and the magazine 26 in the up-down direction to provide a mechanism for moving the driver 16 and loading the driven members n. The sub-motor 51 is provided in this space so that the height of the driving tool 1 can be maintained compact. The sub-motor 51 protrudes toward the right to the extent that it generally follows a right end of the lift mechanism 23 and a right end of the magazine 26 (see FIG. 5). By reducing a protruding amount of the sub-motor 51 toward the right, the driving tool 1 may be prevented from increasing in size in the left-right direction. A bearing 51*b* is provided at a right end of the output shaft 51*a* of the sub-motor 51. A fan 52 is mounted on a right part of the sub-motor 51 and to the left of the bearing 51*b*.

As shown in FIGS. 1 and 2, a disc-shaped cover 53 is mounted at a right end of the sub-motor housing chamber 12*i* so as to cover a right side of the fan 52. A second exhaust port 12*g* is provided between the sub-motor housing chamber 12*i* and the cover 53. The second exhaust port 12*g* is provided radially outside of a lower region of the fan 52. Exhaust air is discharged downwardly from the second exhaust port 12*g*.

As shown in FIG. 4, a conical tapered surface 12*j* is provided on a left side of the sub-motor housing chamber 12*i* so as to cover a left side of the fan 52. The tapered surface 12*j* is depressed toward the center. A center of the tapered surface 12*j* is formed with a circular hole 12*k* that passes through in the left-right direction. The solenoid housing chamber 12*b* and the sub-motor housing chamber 12*i* communicate in the left-right direction through a hole 12*k*. Providing the tapered surface 12*j* and hole 12*k* may increase cooling air momentum generated by rotating fan 52.

The sequence of driving operations of driving tool 1 will be explained next with reference to FIGS. 3 to 13. FIGS. 3, 6, 8, and 11 show the state in which the driver 16 is moved up to the standby position and before the driven member n is loaded into the driving channel 2*a*. FIGS. 7, 10, and 13 show the state when the driven member n is loaded into the driving channel 2*a*. The driver 16 in the standby position is stopped slightly below the top dead center. When the driver 16 is in the standby position, a bottom of a second rack tooth 16*a* from the bottom engages with an engaging portion 25 of the lift mechanism 23, which is one position ahead of the final engaging portion 25*a* (on the counterclockwise side in FIG. 1).

When the contact arm 3 is pressed against a workpiece W, the contact arm 3 moves from a lower position C1 shown in FIG. 6 to an upper position C2 shown in FIG. 7. In conjunction with the contact arm 3, the contact plate 42 connected to the adjuster 41 moves upward. As shown in FIG. 4, the upward movement of contact plate 42 pushes a protruding pin 44*a* of a switch 44 via a spring 43. The switch 44 transmits an ON signal to the controller 9. The controller 9 initiates the main motor 20 when the controller 9 receives the ON signal from the switch 44 and the trigger 6 is pulled. When the main motor 20 is initiated, the wheel 24 of the lift mechanism 23 starts to rotate. This causes the rack teeth 16*a*, which engage with the engaging portion 25, to move upward, and the driver 16 to move upward from the standby position to the top dead center.

As shown in FIGS. 8 to 10, while the driver 16 moves upward from the standby position to the top dead center, one front-most driven member n is loaded in the driving channel 2*a* by the feed mechanism 30. Electric power is supplied to the solenoid 36 immediately before a lower end of the striker 17, which is attached to an end 16*b* of the driver 16, moves upward and passes beyond the head na of the driven member n (see FIG. 9). The plunger 36*a* moves rearward with the plunger connecting portion 35*b* of the power transmitting member 35 from a position shown in FIG. 10 to a position shown in FIG. 9. The power transmitting member 35 rotates rearward about the rotation supporting portion 35*a*. The feed claw 31 moves rearward against the biasing force of the compression spring 32 in conjunction with the rearward movement of the claw connecting portion 35*c* of the power transmitting member 35.

As shown in FIG. 11, the feed claw 31 is pushed by the driven members n that were held by the feed inclined surface 31*a* of the feed claw 31 when the feed claw 31 is moving rearward. Therefore, the feed claw 31 retreats to the right away from the driven member n against the biasing force of the torsion spring 31*d*. As shown in FIG. 12, the feed claw 31 is biased by the torsion spring 31*d* and rotates to the left where the driven members n are located when the plunger 36*a* has moved to the rearmost position. This causes the second driven member n from the front to be interposed between the feed inclined surface 31*a* and the receiving surface 31*b* of the feed claw 31. The front-most driven member n is located immediately behind the striker 17 and is held by a front surface of the non-return claw 33 so as not to move rearward.

At the timing when the lower end of the striker 17 has moved above the head na of the driven member n (see FIG. 9), the electric power to the solenoid 36 is interrupted. The power transmitting member 35 is biased by the compression spring 32 and rotates forward about the rotation supporting portion 35*a*. As shown in FIGS. 12 and 13, the feed claw 31 moves forward while the second driven member n from the front is interposed. On the other hand, the non-return claw 33 is pushed by the driven member n moving forward from the rear, and retreats to the left away from the driven member n against the biasing force of the spring. Therefore, the feed claw 31 can smoothly move forward the connected driven member N, including the interposed driven member n, without being interrupted by the non-return claw 33. As shown in FIG. 10, the connected driven members N move forward so that the front-most driven member n can be loaded into the driving channel 2*a* before the driver 16 moves to the top dead center. The non-return claw 33 rotates from a position shown in FIG. 13 to the right where the driven members n are located while being biased by the spring. This allows the connected driven member N to be restricted from returning to the rear toward the magazine 26.

As shown in FIG. 7, when the driver 16 moves upward to the top dead center and reaches the state immediately before driving, the rotation of the wheel 24 causes the final engaging portion 25*a* to disengage from the bottom of the lowermost rack tooth 16*a*. The driver 16 is biased by the gas pressure within the pressure accumulation chamber 14 applied to the piston and moves downward. The striker 17 strikes the head na of the driven member n in driving channel 2*a*. The struck driven member n is ejected from the ejection port 2*c* into the workpiece W. The connecting member m to connect the ejected driven member n is sheared by an impact when the driver 16 strikes. When the driver 16 moves down, all engaging portions 25 are retreated to the right of the driving channel 2*b*. Therefore, interference between the rack teeth 16*a* of the downwardly moving driver 16 and the engaging portions 25 is avoided, allowing for smooth driving operation.

As shown in FIG. 7, the wheel 24 continues to rotate even during the downward movement of the driver 16 and after it has reached the bottom dead center. When the driver 16 is at the bottom dead center, one of the engaging portions 25 engages the bottom of the uppermost rack tooth 16*a* as the wheel 24 rotates to a predetermined angle of rotation. This initiates the return motion to move the driver 16 upward. As shown in FIG. 11, the next driven member n after the ejected driven member n is interposed between the feed inclined surface 31*a* and the receiving surface 31*b* of the feed claw 31 and is held by the front surface of the non-return claw 33. This places the next driven member n immediately behind the driving channel 2*a*. The rear side of the striker 17 is formed with an arcuate surface 17*a* that follows a shape of the head na of the driven member n. The arcuate surface 17*a* prevents interference between the striker 17 and the head na of the next driven member n. Therefore, the next driven member n can be held as close as possible to the driving channel 2*a*.

As shown in FIG. 6, when the wheel 24 rotates to engage with the bottom of the second rack tooth 16*a* from the bottom with the engaging portion 25*a*, which is one position ahead of the final engaging portion 25*a*, the driver 16 returns to the standby position. For example, by properly measuring the time from the start of the main motor 20 or by properly measuring the position of the wheel 24, the main motor 20 may be stopped when the piston 15 has reached the standby position. This holds the driver 16 in the standby position. With this, the series of driving operations is completed.

Hereinafter, the flow of cooling air in the main body housing 11 will be described. As shown in FIGS. 2 and 4, when the main motor 20 is operating, the fan 21 rotates integrally with the output shaft 20*a*. Cooling air flowing from the rear to the front is generated in the main motor housing chamber 12*a* of the mechanism case 12. The rotation of the fan 21 generates negative pressure inside the battery mount 7, causing the cooling air to flow. When the sub-motor 51 is operating, the fan 52 rotates integrally with the output shaft. Cooling air flowing from the left to the right is generated in the sub-motor housing chamber 12*i*. The rotation of fan 52 generates negative pressure inside the solenoid housing chamber 12*b* and the battery mount 7, causing the cooling air to flow.

As shown in FIG. 8, the sub-motor 51 is operated independently from operation of the main motor 20. The timing for activation of the sub-motor 51 may be freely determined. For example, electric power may be supplied to the sub-motor 51 when a trigger 6 shown in FIG. 2 is pulled. For example, electric power may be supplied to the sub-motor 51 when detected that the contact arm 3 has moved to the upper position C2 (see FIG. 7). For example, the electric power supply to the sub-motor 51 may be configured to be interrupted after a predetermined time after the supply is started. The sub-motor 51 can be driven for a longer time than the main motor 20, for example, when the main motor 20 performs one cycle of driving operation.

As shown in FIG. 8, outside air is first drawn into the solenoid housing chamber 12*b* from the air intake port 12*e* in the second wall 12*d* as cooling air. The cooling air passes between the coil 36*b* (see FIG. 14) of the solenoid 36 and the inner peripheral surface of the holder 36*c* to cool the coil 36*b*. As shown in FIG. 4, the cooling air passes through an air passage A1 (solenoid cooling passage) for allowing the air to flow toward the rear right to the sub-motor housing chamber 12*i* via the hole 12*k*. The cooling air passing through the air passage A1 is directed toward the fan 52 and is further discharged outward from the second exhaust port 12*g* by rotation of the fan 52.

As shown in FIG. 2, outside air is first drawn into the battery mount 7 as cooling air from the air intake port 7*a* at the upper end of the battery mount 7. The cooling air passes near the controller 9 and flows further through an air passage A3 (controller cooling passage), which allows the air to flow down to the communication passage 12*h*. The controller 9 is cooled by the cooling air that passes through the air passage A3. The cooling air passing through the air passage A3 flows from the communication passage 12*h* to the sub-motor housing chamber 12*i* through the hole 12*k* shown in FIG. 4. The cooling air flown into the sub-motor housing chamber 12*i* is discharged outward from the second exhaust port 12*g* by the rotation of the fan 52. A portion of the cooling air passing through the air passage A3 flows through an air passage A2 (motor cooling passage), which branches off at the communication passage 12*h* and flows into the main motor housing chamber 12*a*. The main motor 20 is cooled down by the cooling air that passes through the air passage A2. The cooling air is discharged outward from the first exhaust port 12*f* of the gear housing chamber 12*m*.

As described above, the driving tool 1 has a main motor 20, which is the driving source to generate the electric power to move the driver 16 (see FIGS. 6 and 7) in the driving direction as shown in FIGS. 1 and 2. The driving tool 1 has a main body housing 11 configured to accommodate the main motor 20. The driving tool 1 has a sub-motor 51 that is accommodated in the main body housing 11 and is driven independently from the main motor 20. The driving tool 1 has a fan 52 mounted on the output shaft 51*a* of the sub-motor 51.

Therefore, the sub-motor 51 is driven independently of driving of the main motor 20. Therefore, the sub-motor 51 can be driven longer than the driving time of the main motor 20 to rotate the fan 52. Therefore, cooling air can be supplied to the main motor 20, the sub-motor 51, and other electrical components in the main body housing 11 for a sufficient time. This allows the electrical components in the main body housing 11 to be cooled efficiently.

As shown in FIG. 2, the driving tool 1 has a controller 9 that transmits a drive signal to the sub-motor 51 to allow the sub-motor 51 to be driven even when the main motor 20 is stopped. Therefore, by allowing the sub-motor 51 to be driven even when the main motor 20 is stopped, the time for the cooling air to cool the electrical components can be extended. This ensures sufficient cooling of the electrical components.

As shown in FIGS. 8 to 10, the sub-motor 51 is driven longer than the driving time of the main motor 20 when the driver 16 is driven for one cycle of driving operation. Therefore, by extending the driving time of the sub-motor 51 longer than that of main motor 20, the cooling efficiency of the electrical components by the cooling air can be improved.

As shown in FIGS. 8 to 10, the driving tool 1 has a magazine 26 for accommodating driven members n. The driving tool 1 has a driver guide 4 that is supplied with the driven members n from the magazine 26 and guides the driver 16 in a movable manner. A sub-motor 51 is provided between the main motor 20 and the magazine 26. Thus, the sub-motor 51 can be compactly arranged between the main motor 20 and the magazine 26. The arrangement of the magazine 26 relative to the main body housing 11 is set in accordance with the position where the driven members n are fed into the driver guide 4. Therefore, a space must be provided between the main motor 20 and the magazine 26. By using this space to arrange the sub-motor 51, the driving tool 1 can be disposed in a compact space. Also, the sub-motor 51 can be placed close to the main motor 20. Therefore, the cooling efficiency of the main motor 20 can be improved by driving the sub-motor 51.

As shown in FIG. 8, the driving tool 1 has a feed claw 31 configured to feed the driven members n from the magazine 26 to the driver guide 4. The driving tool 1 has a solenoid 36 that moves the feed claw 31 in a direction opposite to the feeding direction. The solenoid 36 is provided between the main motor 20 and the magazine 26. Therefore, the solenoid 36 is placed using the space between the main motor 20 and the magazine 26. This allows the driving tool 1 to be made compact. Also, the solenoid 36 can be placed near the sub-motor 51. Therefore, the cooling efficiency of the solenoid 36 can be improved by driving the sub-motor 51.

As shown in FIG. 14, the solenoid 36 has a tubular holder 36*c* for accommodating a coil 36*b*. As shown in FIG. 2, the main body housing 11 is provided with an air passage (solenoid cooling passage) through which air flows to pass between the coil 36*b* and an inner peripheral surface of the holder 36*c* when the sub-motor 51 is driven. Therefore, the air passage A1 can be provided to directly contact the coil 36*b*. Moreover, heated cooling air is allowed to flow away from the coil 36*b* quickly. Therefore, the coil 36*b* can be cooled efficiently.

As shown in FIG. 2, the output shaft 51*a* of the sub-motor 51 extends in a direction intersecting an extending direction of the output shaft 51*a* of the main motor 20 and the driving direction of the driven member n. Therefore, by intersecting the output shaft 51*a* of the sub-motor 51 with the output shaft 51*a* of the main motor 20, the sub-motor 51, including the fan 52, can be compactly arranged with respect to the main motor 20. By intersecting the output shaft 51*a* of the sub-motor 51 with the driving direction of the driven member n, the driving tool 1 can be prevented from increasing in size in the driving direction. Therefore, the sub-motor 51 can be compactly arranged.

As shown in FIG. 2, the driving tool 1 has a main motor 20 and a controller 9 configured to transmit a driving signal to the sub-motor 51. The main body housing 11 has an air passage A3 (controller cooling passage) through which cooling air flows to cool down the controller 9 when the sub-motor 51 is driven. Therefore, the controller 9 can be cooled when the main motor 20 is driving and stopped. Therefore, the cooling efficiency of the controller 9 can be improved.

As shown in FIGS. 6 and 7, the driving tool 1 has a piston 15 connected to the driver 16. The piston 15 moves inside a cylinder 13. The main motor 20 moves the driver 16 back in the counter-driving direction to increase the gas pressure in the cylinder 13. Therefore, in the so-called gas-spring type driving tool 1, the cooling efficiency of the main motor 20 and other electrical components can be improved by driving the sub-motor 51.

Hereinafter, the second embodiment of the present disclosure will be described with reference to FIGS. 15 and 16. The main body housing 11 of the driving tool 60 in the second embodiment has a mechanism case 61 (motor housing) instead of the mechanism case 12 shown in FIG. 1. In the following description, only parts that differ from the first embodiment will be described in detail. The mechanism case 61 is provided to have a substantially cylindrical shape extending in the front-rear direction below the grip 5. The mechanism case 61 has a main motor housing chamber 61*a*, a gear housing chamber 61*m*, a lifter housing chamber 61*n*, a solenoid housing chamber 61*b*, a sub-motor housing chamber 61*i*, and a communication passage 61*h*. These configurations are similar to those of the main motor housing chamber 12*a*, the gear housing chamber 12*m*, the lifter housing chamber 12*n*, the solenoid housing chamber 12*b*, the sub-motor housing chamber 12*i*, and the communication passage 12*h* of the mechanism case 12 shown in FIG. 2.

Figure 15:
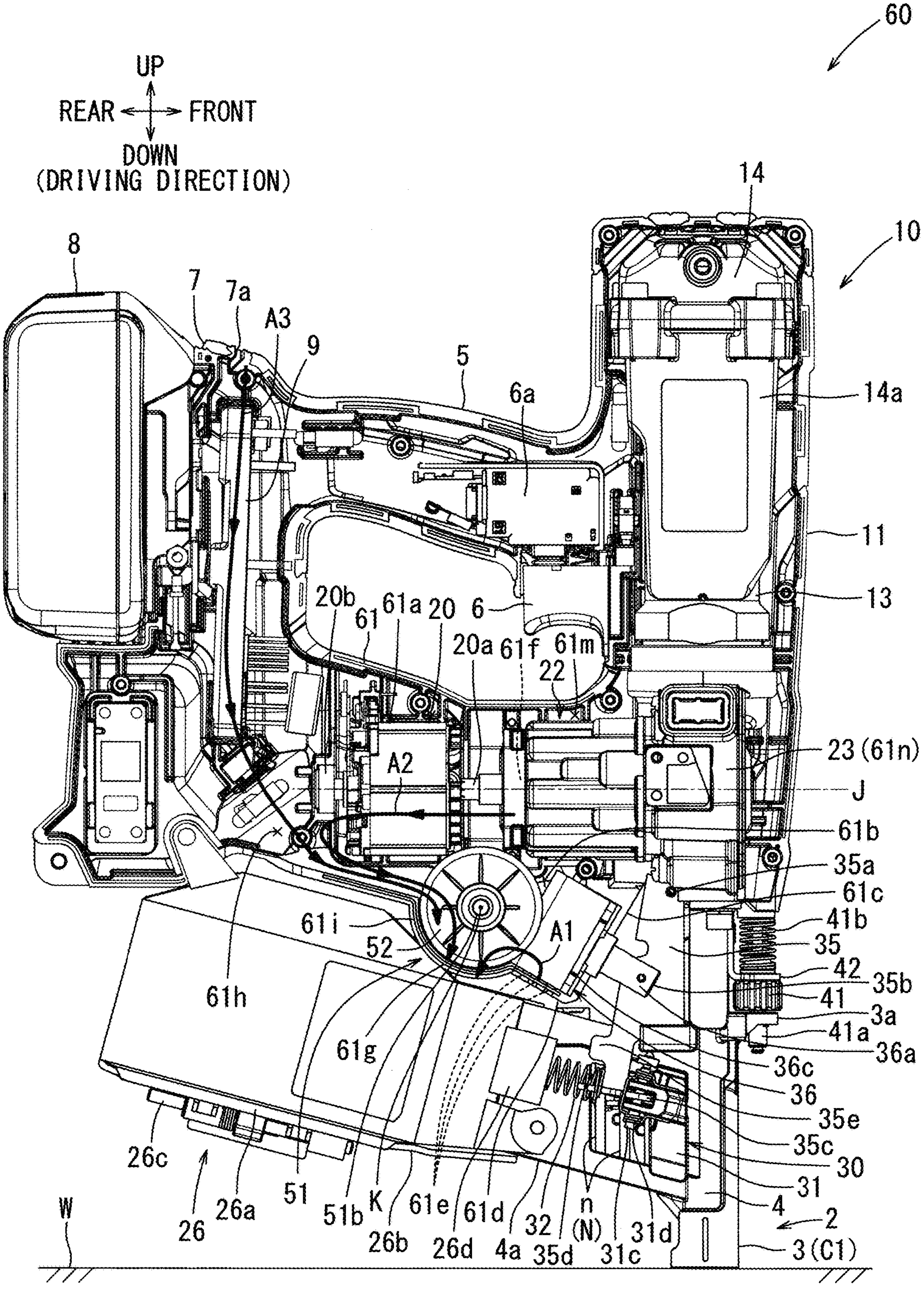
FIG. 15 is a right side view of the driving tool according to a second embodiment, with the right housing removed.
Figure 16:
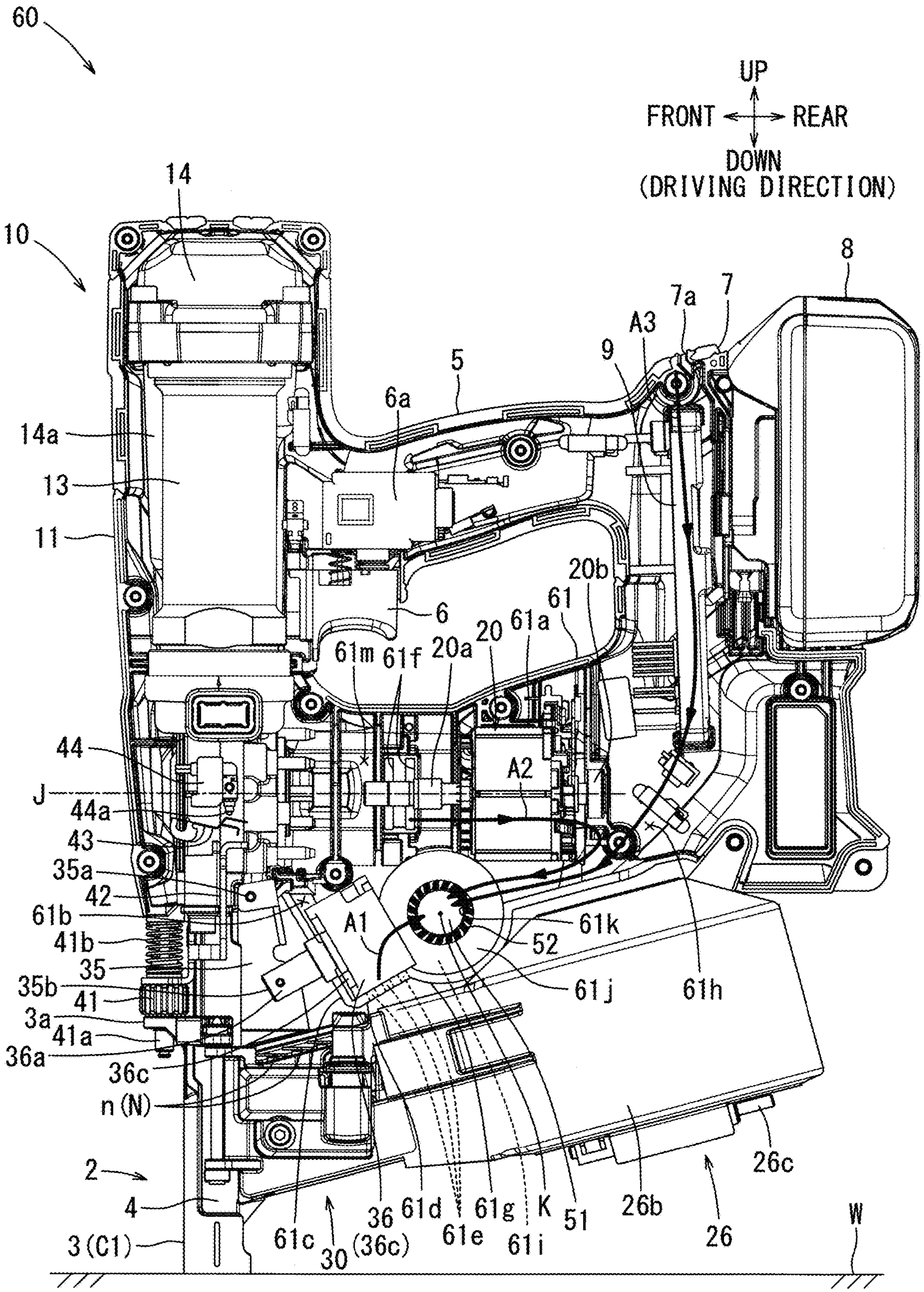
FIG. 16 is a left side view of the driving tool with the left housing removed.

As shown in FIGS. 15 and 16, the solenoid 36 is accommodated in a front part of the solenoid housing chamber 61*b*, which is formed in a substantially rectangular box shape. The plunger 36*a* of the solenoid 36 extends in a downwardly inclined direction toward the front with respect to the output shaft axis J. The solenoid housing chamber 61*b* has a first wall 61*c* facing the driving nose 2 on a front side and a second wall 61*d* facing the magazine 26 on a lower side. The plunger 36*a* protrudes from a center of the first wall 61*c* out of the solenoid housing chamber 61*b*. The second wall 61*d* has a first air intake port 61*e* that passes through the solenoid housing chamber 61*b* from inside to outside. The first air intake port 61*e* is aligned with the solenoid 36 one above the other. The air intake port 12*e* is aligned with the solenoid 36 one above the other. A second air intake port 61*f* passing from inside to outside is provided on left and right sides of the gear housing chamber 61*m*.

As shown in FIGS. 15 and 16, the sub-motor housing chamber 61*i* is provided in a substantially cylindrical shape with the left-right direction as the axial direction. The output shaft 51*a* of the sub-motor 51 extends in the left-right direction on the output shaft axis K substantially orthogonal to the output shaft axis J and the driving direction. A fan 52 is mounted on the right part of the sub-motor 51 and to the left of the bearing 51*b*. On the other hand, no fan is mounted on the output shaft 20*a* of the main motor 20. A disc-shaped cover (not shown) is attached to a right end of the sub-motor housing chamber 61*i* so as to cover the right side of the fan 52. An exhaust port 61*g* is provided between the sub-motor housing chamber 61*i* and the cover. The exhaust port 61*g* is provided radially outward in a lower region of the fan 52. Exhaust air is discharged downwardly from the exhaust port 61*g*.

As shown in FIG. 16, a conical tapered surface 61*j* is provided on a left side of the sub-motor housing chamber 61*i* so as to cover a left side of the fan 52. The tapered surface 61*j* is depressed to the right toward the center. A center of the tapered surface 61*j* is formed with a circular hole 61*k* that passes through in the left-right direction. The hole 61*k* allows the solenoid housing chamber 61*b* to communicate with the sub-motor housing chamber 61*i* in the left-right direction.

Hereinafter, the flow of cooling air in the main body housing 11 will be described with reference to FIGS. 15 and 16. When the sub-motor 51 starts, the fan 52 rotates integrally with the output shaft. Cooling air flowing from the left to the right is generated in the sub-motor housing chamber 61*i*. On the other hand, since no fan is installed in the main motor 20, no cooling air is generated when the main motor 20 starts. The rotation of the fan 52 generates negative pressure inside the solenoid housing chamber 61*b* and battery mount 7, causing cooling air to flow. The sub-motor 51 is driven independently from the main motor 20, for example, when electric power is supplied to the solenoid 36. The sub-motor 51 stops, for example, when the electric power supply is interrupted after a predetermined time after the electric power supply to the solenoid 36 is interrupted. The sub-motor 51 can be driven for a longer time than the main motor 20, for example, when the main motor 20 performs one cycle of driving operation.

Outside air is first drawn into the solenoid housing chamber 61*b* from the first air intake port 61*e* in the second wall 61*d* as cooling air. The cooling air passes between the coil 36*b* (see FIG. 14) of the solenoid 36 and the inner peripheral surface of the holder 36*c* to cool the coil 36*b*. The cooling air passes through the air passage A1 (solenoid cooling passage) for allowing the air to flow to the rear right toward the sub-motor housing chamber 61*i* through the hole 61*k*. The cooling air passing through the air passage A1 is directed toward the fan 52 and is further discharged outward from the exhaust port 61*g* by rotation of the fan 52.

As shown in FIG. 16, the outside air is first drawn into the main motor housing chamber 61*a* from the second air intake port 61*f* of the gear housing chamber 12*m* as cooling air. The cooling air passes through the air passage A2 (motor cooling passage), which flows from inside the main motor housing chamber 61*a* to the rear toward the communication passage 61*h*. The main motor 20 is cooled by the cooling air flowing through the air passage A2. The cooling air passing through the air passage A2 flows from the communication passage 61*h* to the sub-motor housing chamber 61*i* through the hole 61*k*. The cooling air flown into the sub-motor housing chamber 61*i* is discharged outward from the exhaust port 61*g* by rotation of the fan 52.

As shown in FIG. 16, the outside air is first drawn into the battery mount 7 as cooling air from the air intake port 7*a* at the upper end of the battery mount 7. The cooling air passes near the controller 9 and through the air passage A3 (controller cooling passage) for allowing the air to flow further down to the communication passage 61*h*. The controller 9 is cooled by the cooling air that passes through the air passage A3. The cooling air that passes through the air passage A3 flows from the communication passage 61*h* to the sub-motor housing chamber 61*i* through the hole 61*k*. The cooling air flown into the sub-motor housing chamber 61*i* is discharged outward from the exhaust port 61*g* by the rotation of the fan 52. Thus, the cooling air that cools the solenoid 36, the main motor 20, and the controller 9, respectively, is discharged from the common exhaust port 61*g* provided in the sub-motor housing chamber 61*i*.

As described above, the output shaft 20*a* of the main motor 20 has no fan, as shown in FIG. 15. The main body housing 11 has an air passage A2 (motor cooling passage)

through which the air flows to the main motor 20 by driving the sub-motor 51 (see FIG. 1). Therefore, the main motor 20 can be cooled by the sub-motor 51 when the main motor 20 is driving and stopped. Therefore, the cooling efficiency of the main motor 20 can be improved. Furthermore, by not providing a fan on the output shaft 20*a* of the main motor 20, the load on the main motor 20 can be reduced.

As shown in FIG. 15, the main body housing 11 has cooling passages A1, A2, and A3 through which the air flows by driving the sub-motor 51. The main body housing 11 has an exhaust port 61*g* for discharging air flowing through the cooling passages A1, A2, and A3. The exhaust port 61*g* is common to the plurality of cooling passages A1, A2, and A3. Therefore, with the common exhaust port 61*g*, the air flow in the plurality of cooling passages can be made smooth with less turbulence. This ensures efficient cooling of a plurality of electrical components. Furthermore, the air can be exhausted through the common exhaust port 61*g* without compromising the comfort of the user who are grasping the driving tool 60.

Various modifications may be made to the driving tools 1, 50, 60 and 70 in each embodiment as described above. A gas-spring type driving tool has been described as an example. Instead, the present disclosure may be applied, for example, to a mechanical spring type driving tool, in which a driver is ejected using a spring force of a mechanical compression spring generated when the driver is moved in the counter-driving direction by a lift mechanism. For example, the present disclosure may be applied to a flywheel type driving tool that uses the inertia force of a flywheel to eject a driver. For example, the present disclosure may be applied to an electro-pneumatic driving tool that uses compressed air generated by rotating a crank with an electric motor.

A location of the sub-motor 51 is not limited to a location described as an example but may be changed as needed. For example, there may be cases where it is difficult to place the sub-motor 51 between the main motor 20 and the magazine 26, or where there is no solenoid 36 to feed driven members n to the driver guide 4. In such cases, for example, as shown in FIG. 2, the sub-motor 51 and the sub-motor housing chamber 12*i* may be provided near the communication passage 12*h* located below the controller 9 and behind the main motor 20. As shown in FIG. 2, an example of a configuration in which the controller 9 is provided in front of the battery 8 in the battery mount 7 has been described as an example. Alternatively, the controller 9 may be placed, for example, near the sub-motor 51 so as to be entered in the solenoid housing chamber 12*b*. By placing the controller 9 closer to the sub-motor 51, the cooling effect of the controller 9 by rotating the fan 52 with the sub-motor 51 may be enhanced.

For example, the sub-motor 51 may be applied to driving tools that do not require the solenoid 36 to feed the driven members n from the magazine 26 to the driving channel 2*a*. Even if the solenoid 36 is not provided, the driving time of the main motor 20 of the driving tool 1 is short. Therefore, the sufficient cooling effect can be achieved by rotating the fan 52 with the sub-motor 51. In a case like the present disclosure where the solenoid 36 is provided, the cooling effect by the sub-motor 51 is more useful because the large amount of heat is generated by the solenoid 36.

As shown in FIG. 3, an example of a configuration has been described to provide an air intake port 12*e* in the second wall 12*d* of the solenoid housing chamber 12*b*. Instead of or in addition to this configuration, an air intake port may be provided in the first wall 12*c*.

What is claimed is:

1. A fastener driving tool comprising:
- a main motor configured to generate a driving force to drive a driver;
- a main body housing configured to accommodate the main motor;
- a sub-motor configured to be driven independently from the main motor; and
- a fan that is mounted on an output shaft of the sub-motor, wherein the sub motor is utilized to provide a cooling function to the fastener driving tool.

2. The driving tool according to claim 1, further comprising a controller configured to transmit a drive signal for driving the sub-motor even when the main motor is stopped.

3. The driving tool according to claim 1, wherein the sub-motor is driven longer than a driving time of the main motor when the driver is driven for one cycle of driving operation.

4. The driving tool according to claim 1, further comprising a magazine configured to accommodate driven members, and
- a driver guide configured to receive a driven member supplied from the magazine and configured to guide the driver in a movable manner,
- wherein the sub-motor is located in between the main motor and the magazine.

5. The driving tool according to claim 4, further comprising a feed claw configured to load the driven members from the magazine into the driver guide, and
- a solenoid configured to move the feed claw in a direction opposite to a feeding direction,
- wherein the solenoid is located in between the main motor and the magazine.

6. The driving tool according to claim 5, wherein the solenoid has a tubular holder for accommodating a coil, and
- the main body housing has a solenoid cooling passage flowing air between the coil and an inner peripheral surface of the holder by driving the sub-motor.

7. The driving tool according to claim 1, wherein the output shaft of the sub-motor is configured to be extendable in a direction intersecting an extending direction of an output shaft of the main motor and a driving direction of a driven member.

8. The driving tool according to claim 1, wherein the main body housing has a motor cooling passage for flowing air to the main motor by driving the sub-motor.

9. The driving tool according to claim 1, further comprising a controller configured to transmit a drive signal to the main motor and the sub-motor, and
- wherein the main body housing has a controller cooling passage for flowing air to the controller by driving the sub-motor.

10. The driving tool according to claim 1, wherein the main body housing further includes
- a plurality of cooling passages for flowing air by driving the sub-motor, and
- an exhaust port for discharging the air flowing through the plurality of cooling passages,
- wherein the exhaust port is common to the plurality of cooling passages.

11. The driving tool according to claim 1, further comprising a piston that is connected to the driver, and
- a cylinder in which the piston is movably provided,
- wherein the main motor moves the driver back in a counter-driving direction to increase gas pressure in the cylinder.

12. A fastener driving tool comprising:

a main motor configured to generate a driving force to drive a driver;

a main body housing configured to accommodate the main motor;

a sub-motor driven independently from the main motor to generate a rotational force to rotate a fan, the sub-motor having an output shaft on which the fan is mountable, wherein the sub motor is utilized to provide a cooling function to the fastener driving tool; and a controller configured to transmit a drive signal for driving the sub-motor when the main motor stops driving.

13. The driving tool of claim 12, wherein the main body housing further has a plurality of cooling passages and an exhaust port for discharging air flowing through the plurality of passages.

14. The driving tool of claim 12, wherein the fan is configured to rotate integrally with the output shaft.

15. The driving tool of claim 12, further comprising a planetary reduction mechanism configured to decelerate a rotary drive of the output shaft.

16. The driving tool of claim 15, wherein the planetary reduction mechanism has a bearing to rotatably support the output shaft.

17. The driving tool of claim 15, wherein the planetary reduction mechanism has at least three gear trains.

18. The driving tool of claim 12, further comprising a mechanism case having a main motor housing chamber, a gear housing chamber, a lifter housing chamber, a solenoid housing chamber, a sub-motor housing chamber, and a communication passage.

19. The driving tool of claim 12, further comprising a solenoid, wherein the solenoid has a tubular holder for accommodating a coil.

20. The driving tool of claim 19, wherein the main body housing has a solenoid cooling passage for flowing air between the coil and the tubular holder.

* * * * *